(12) United States Patent
Kawashima et al.

(10) Patent No.: US 8,068,201 B2
(45) Date of Patent: Nov. 29, 2011

(54) LIQUID CRYSTAL DISPLAY HAVING PARTICULAR AUXILIARY ELECTRODE

(75) Inventors: Yuki Kawashima, Osaka (JP); Yasutoshi Tasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 378 days.

(21) Appl. No.: 12/519,447

(22) PCT Filed: Nov. 30, 2007

(86) PCT No.: PCT/JP2007/073231
§ 371 (c)(1),
(2), (4) Date: Jun. 16, 2009

(87) PCT Pub. No.: WO2008/075549
PCT Pub. Date: Jun. 26, 2008

(65) Prior Publication Data
US 2010/0060813 A1    Mar. 11, 2010

(30) Foreign Application Priority Data
Dec. 18, 2006 (JP) .................... 2006-339795

(51) Int. Cl.
G02F 1/1337 (2006.01)
G02F 1/1343 (2006.01)
G02F 1/141 (2006.01)
(52) U.S. Cl. ........ 349/130; 349/129; 349/143; 349/134; 349/38; 349/39
(58) Field of Classification Search .................. 349/130, 349/129, 143, 134, 38, 39
See application file for complete search history.

(56) References Cited

U.S. PATENT DOCUMENTS

| 4,345,249 A | 8/1982 | Togashi |
| 4,368,523 A | 1/1983 | Kawate |
| 4,889,412 A | 12/1989 | Clerc et al. |
| 4,955,698 A | 9/1990 | Knoll et al. |
| 5,132,819 A | 7/1992 | Noriyama et al. |
| 5,164,851 A | 11/1992 | Kanemori et al. |
| 5,179,456 A | 1/1993 | Aizawa et al. |
| 5,182,664 A | 1/1993 | Clerc |

(Continued)

FOREIGN PATENT DOCUMENTS

CN    1544985 A    11/2004
(Continued)

OTHER PUBLICATIONS

International Search Report mailed Jul. 1, 2008 in PCT application PCT/JP2008/001350.

(Continued)

*Primary Examiner* — Mike Qi
(74) *Attorney, Agent, or Firm* — Nixon & Vanderhye P.C.

(57) ABSTRACT

A vertical orientation liquid crystal display in which orientation control by oblique electric field is performed stably and lowering in light transmission rate of the liquid crystal display is suppressed without increasing the number of manufacturing steps significantly. In the vertical orientation liquid crystal display, a plurality of regions having different inclination orientations of liquid crystal molecule are formed by applying a voltage to each pixel electrode having an aperture or a recessed portion. The liquid crystal display comprises a switching element connected electrically with the pixel electrode, and an auxiliary electrode formed to overlap the aperture or the recessed portion in the pixel electrode wherein the auxiliary electrode is formed of the same film as that of the semiconductor layer in the switching element.

12 Claims, 20 Drawing Sheets

U.S. PATENT DOCUMENTS

| | | |
|---|---|---|
| 5,245,450 A | 9/1993 | Ukai et al. |
| 5,260,818 A | 11/1993 | Wu |
| 5,289,174 A | 2/1994 | Suzuki |
| 5,309,264 A | 5/1994 | Lien et al. |
| 5,331,447 A | 7/1994 | Someya et al. |
| 5,363,294 A | 11/1994 | Yamamoto et al. |
| 5,408,345 A | 4/1995 | Mitsui et al. |
| 5,434,687 A | 7/1995 | Kawata et al. |
| 5,477,358 A | 12/1995 | Rosenblatt et al. |
| 5,508,834 A | 4/1996 | Yamada et al. |
| 5,512,336 A | 4/1996 | Yamahara |
| 5,558,927 A | 9/1996 | Aruga et al. |
| 5,594,570 A | 1/1997 | Hirata et al. |
| 5,602,662 A | 2/1997 | Rosenblatt et al. |
| 5,608,556 A | 3/1997 | Koma |
| 5,636,043 A | 6/1997 | Uemura et al. |
| 5,646,702 A | 7/1997 | Akinwande et al. |
| 5,666,179 A | 9/1997 | Koma |
| 5,668,651 A | 9/1997 | Yamada et al. |
| 5,673,092 A | 9/1997 | Horie et al. |
| 5,699,137 A | 12/1997 | Kishimoto |
| 5,726,728 A | 3/1998 | Kondo et al. |
| 5,748,276 A | 5/1998 | Uno et al. |
| 5,753,093 A | 5/1998 | Raguse et al. |
| 5,995,176 A | 11/1999 | Sibahara |
| 6,031,591 A | 2/2000 | Hamanaka |
| 6,061,117 A | 5/2000 | Horie et al. |
| 6,069,740 A | 5/2000 | Hamanaka |
| 6,097,464 A | 8/2000 | Liu |
| 6,129,439 A | 10/2000 | Hou et al. |
| 6,141,077 A | 10/2000 | Hirata et al. |
| 6,169,593 B1 | 1/2001 | Kanaya et al. |
| 6,175,398 B1 | 1/2001 | Yamada et al. |
| 6,195,140 B1 | 2/2001 | Kubo et al. |
| 6,201,592 B1 | 3/2001 | Terashita et al. |
| 6,222,599 B1 | 4/2001 | Yoshida et al. |
| 6,256,082 B1 | 7/2001 | Suzuki et al. |
| 6,266,122 B1 | 7/2001 | Kishimoto et al. |
| 6,287,649 B1 | 9/2001 | Fukushima et al. |
| 6,330,047 B1 | 12/2001 | Kubo et al. |
| 6,335,780 B1 | 1/2002 | Kurihara et al. |
| 6,339,462 B1 | 1/2002 | Kishimoto et al. |
| 6,340,998 B1 | 1/2002 | Kim et al. |
| 6,341,002 B1 | 1/2002 | Shimizu et al. |
| 6,342,938 B1 | 1/2002 | Song et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,567,144 B1 | 5/2003 | Kim et al. |
| 6,573,964 B1 | 6/2003 | Takizawa et al. |
| 6,573,965 B1 | 6/2003 | Liu et al. |
| 6,577,366 B1 | 6/2003 | Kim et al. |
| 6,593,982 B2 | 7/2003 | Yoon et al. |
| 6,600,539 B2 | 7/2003 | Song |
| 6,614,497 B2 | 9/2003 | Yamada |
| 6,630,975 B1 | 10/2003 | Terashita |
| 6,633,351 B2 | 10/2003 | Hira et al. |
| 6,657,695 B1 | 12/2003 | Song et al. |
| 6,661,488 B1 | 12/2003 | Takeda et al. |
| 6,710,825 B2 | 3/2004 | Kubo et al. |
| 6,717,642 B2 | 4/2004 | Sasaki et al. |
| 6,784,961 B2 | 8/2004 | Suzuki et al. |
| 6,788,375 B2 | 9/2004 | Ogishima et al. |
| 6,812,986 B2 | 11/2004 | Takatori et al. |
| 6,822,723 B2 | 11/2004 | Song et al. |
| 6,829,026 B2 | 12/2004 | Sasaki et al. |
| 6,839,108 B1 | 1/2005 | Hirakata et al. |
| 6,862,062 B2 | 3/2005 | Kubo et al. |
| 6,894,840 B2 | 5/2005 | Yamanaka et al. |
| 6,924,856 B2 | 8/2005 | Okumura et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,967,702 B2 | 11/2005 | Ishii et al. |
| 6,989,874 B2 | 1/2006 | Chae |
| 6,995,826 B2 | 2/2006 | Kubo et al. |
| 7,084,943 B2 | 8/2006 | Kubo et al. |
| 7,139,055 B2 | 11/2006 | Ogishima et al. |
| 7,145,624 B2 | 12/2006 | Kubo et al. |
| 7,202,923 B2 | 4/2007 | Yamabuchi et al. |
| 7,215,395 B2 | 5/2007 | Kubo et al. |
| 7,230,664 B2 | 6/2007 | Kubo et al. |
| 7,253,872 B2 | 8/2007 | Kume et al. |
| 7,277,146 B2 | 10/2007 | Maeda |
| 7,292,300 B2 | 11/2007 | Kubo et al. |
| 7,375,781 B2 | 5/2008 | Kubo |
| 7,379,137 B2 | 5/2008 | Kubo |
| 7,391,489 B2 | 6/2008 | Kume et al. |
| 7,499,136 B2 | 3/2009 | Kubo |
| 7,505,102 B2 | 3/2009 | Kubo et al. |
| 7,532,291 B2 | 5/2009 | Kubo et al. |
| 7,583,332 B2 | 9/2009 | Lee |
| 2001/0024257 A1 | 9/2001 | Kubo et al. |
| 2001/0033353 A1 | 10/2001 | Shimoshikiryo |
| 2002/0036740 A1 | 3/2002 | Kubo et al. |
| 2002/0036744 A1 | 3/2002 | Kubo et al. |
| 2002/0054269 A1 | 5/2002 | Maeda et al. |
| 2002/0060764 A1 | 5/2002 | Taniguchi et al. |
| 2002/0063834 A1 | 5/2002 | Sawasaki et al. |
| 2002/0075436 A1 | 6/2002 | Kubo et al. |
| 2002/0080320 A1 | 6/2002 | Suzuki et al. |
| 2002/0149728 A1 | 10/2002 | Ogishima et al. |
| 2002/0159012 A1 | 10/2002 | Yamada |
| 2002/0171792 A1 | 11/2002 | Kubota et al. |
| 2002/0191128 A1 | 12/2002 | Okumura et al. |
| 2003/0001998 A1 | 1/2003 | Kun |
| 2003/0107695 A1 | 6/2003 | Kubo et al. |
| 2003/0112213 A1 | 6/2003 | Noguchi et al. |
| 2003/0202144 A1 | 10/2003 | Kim et al. |
| 2003/0227429 A1 | 12/2003 | Shimoshikiryo |
| 2003/0231267 A1 | 12/2003 | Murai et al. |
| 2004/0041770 A1 | 3/2004 | Kubo et al. |
| 2004/0070714 A1 | 4/2004 | Ishii et al. |
| 2004/0135949 A1 | 7/2004 | Maeda |
| 2004/0201810 A1 | 10/2004 | Kubo et al. |
| 2004/0225312 A1 | 11/2004 | Orloff et al. |
| 2004/0233360 A1 | 11/2004 | Yoshida et al. |
| 2005/0001947 A1 | 1/2005 | Ogishima et al. |
| 2005/0030458 A1 | 2/2005 | Sasabayashi et al. |
| 2005/0041186 A1 | 2/2005 | Shimoshikiryo |
| 2005/0056127 A1 | 3/2005 | Yamabuchi et al. |
| 2005/0078251 A1 | 4/2005 | Chen et al. |
| 2005/0140876 A1 | 6/2005 | Kubo |
| 2005/0168674 A1 | 8/2005 | Kubo |
| 2005/0213008 A1 | 9/2005 | Kubo et al. |
| 2005/0237463 A1 | 10/2005 | Kubo |
| 2005/0270462 A1 | 12/2005 | Koma |
| 2005/0280754 A1 | 12/2005 | Kume et al. |
| 2006/0061708 A1 | 3/2006 | Umebayashi et al. |
| 2006/0114405 A1* | 6/2006 | Yamaguchi et al. .......... 349/178 |
| 2006/0119776 A1 | 6/2006 | Kubo et al. |
| 2006/0139541 A1* | 6/2006 | Yamaguchi et al. .......... 349/130 |
| 2006/0139758 A1 | 6/2006 | Segawa et al. |
| 2006/0158574 A1 | 7/2006 | Kubo et al. |
| 2006/0278874 A1 | 12/2006 | Kubo et al. |
| 2006/0291065 A1 | 12/2006 | Hasei et al. |
| 2007/0019132 A1 | 1/2007 | Kim et al. |
| 2007/0097293 A1 | 5/2007 | Nakanishi et al. |
| 2007/0139594 A1 | 6/2007 | Kubo et al. |
| 2007/0199504 A1 | 8/2007 | Nakamura et al. |
| 2007/0216827 A1 | 9/2007 | Okada et al. |
| 2008/0266499 A1 | 10/2008 | Kubo |
| 2009/0284683 A1 | 11/2009 | Usukura et al. |
| 2010/0007815 A1 | 1/2010 | Kosegawa et al. |
| 2010/0020263 A1 | 1/2010 | Murao et al. |
| 2010/0039583 A1 | 2/2010 | Usukura |
| 2010/0060813 A1 | 3/2010 | Kawashima et al. |
| 2010/0110352 A1 | 5/2010 | Saitoh et al. |
| 2010/0118227 A1 | 5/2010 | Shibata et al. |
| 2010/0157213 A1 | 6/2010 | Kubo |

FOREIGN PATENT DOCUMENTS

| | | |
|---|---|---|
| EP | 0 645 661 A1 | 3/1995 |
| EP | 0 884 626 A2 | 12/1998 |
| JP | 63-21907 B2 | 5/1988 |

| | | |
|---|---|---|
| JP | 63-296004 | 12/1988 |
| JP | 1-129234 | 5/1989 |
| JP | 02-149802 | 6/1990 |
| JP | 03-209440 | 9/1991 |
| JP | 04-139402 | 5/1992 |
| JP | 04-293018 | 10/1992 |
| JP | 04-318816 | 11/1992 |
| JP | 05-188364 | 7/1993 |
| JP | 05-289108 | 11/1993 |
| JP | 5-333328 | 12/1993 |
| JP | 06-034966 | 2/1994 |
| JP | 06-043461 | 2/1994 |
| JP | 6-75238 A | 3/1994 |
| JP | 06-118909 | 4/1994 |
| JP | 6-301036 | 10/1994 |
| JP | 6-331831 | 12/1994 |
| JP | 07-027913 | 1/1995 |
| JP | 07-036058 | 2/1995 |
| JP | 07-234400 | 9/1995 |
| JP | 7-281176 A | 10/1995 |
| JP | 07-311383 | 11/1995 |
| JP | 08-148254 | 6/1996 |
| JP | 08-292423 | 11/1996 |
| JP | 09-258266 | 10/1997 |
| JP | 09-269509 | 10/1997 |
| JP | 10-186330 A | 7/1998 |
| JP | 10-301114 A | 11/1998 |
| JP | 11-095197 | 4/1999 |
| JP | 11-109417 A | 4/1999 |
| JP | 11-242225 A | 9/1999 |
| JP | 11-295697 | 10/1999 |
| JP | 2000-47217 | 2/2000 |
| JP | 2000-075296 | 3/2000 |
| JP | 2000-249807 | 9/2000 |
| JP | 2000-305110 | 11/2000 |
| JP | 2000-329906 | 11/2000 |
| JP | 2001-021862 A | 1/2001 |
| JP | 2000-47253 | 8/2001 |
| JP | 2001-343647 A | 12/2001 |
| JP | 2002-055343 A | 2/2002 |
| JP | 2002-236283 | 8/2002 |
| JP | 2003-035824 | 2/2003 |
| JP | 2003-043514 | 2/2003 |
| JP | 2003-43525 A | 2/2003 |
| JP | 2003-270636 | 9/2003 |
| JP | 2003-280548 | 10/2003 |
| JP | 2003-315803 | 11/2003 |
| JP | 2003-337207 | 11/2003 |
| JP | 2004-302195 | 10/2004 |
| JP | 2004-325503 | 11/2004 |
| JP | 2005-128082 | 5/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184334 | 7/2006 |
| JP | 2006-184673 | 7/2006 |
| JP | 2006-220711 | 8/2006 |
| JP | 1 701 202 A1 | 9/2006 |
| JP | 2006-293410 | 10/2006 |
| JP | 2007-133037 | 5/2007 |
| JP | 2007-329099 | 12/2007 |
| JP | 2008-242307 A | 10/2008 |
| KR | 2003-058012 A | 7/2003 |
| KR | 2003-058140 A | 7/2003 |
| WO | 00/22677 | 4/2000 |

OTHER PUBLICATIONS

U.S. Office Action mailed Feb. 2, 2011 in U.S. Appl. No. 12/440,791.
International Preliminary Report on Patentability mailed Apr. 9, 2009 in PCT Application No. PCT/JP2007/064447.
International Search Report for PCT/JP2006/315142 mailed Aug. 22, 2006.
U.S. Office Action mailed Jun. 23, 2010 in U.S. Appl. No. 11/997,563.
Notice of Allowance mailed Apr. 27, 2011 in U.S. Appl. No. 11/997,563.
International Search Report for PCT/JP2007/070907, mailed Nov. 20, 2007.
K. Kalantar, "Viewing Angle Control using Optical Microstructures on Light-Guide Plate for Illumination System of Mobile Transmissive LCD Module", IDW'02, pp. 549-552.
A. Funamoto et al., "Prism-Sheetless High Bright Backlight System for Mobile Phone", IDW'04, pp. 687-690.
Suqita et al, "Brightness Enhancement in Transflective LCD by Concentration of Uniaxially Collimated Light with a Micro-Lenticular Lens", , IDW 2007, pp. 1515-1518.
English translation of International Preliminary Report on Patentability mailed in PCT Application No. PCT/JP2007/070907.
International Search Report for PCT/JP2007/074635, mailed Jan. 29, 2008.
English translation of the International Preliminary Report on Patentability mailed Feb. 14, 2008 in PCT Application No. PCT/JP2006/315142.
Kubo et al., "Development of High-Performance ASV-LCDs Using Continuous Pinwheel Alignment (CPA) Mode", pp. 1-5, Jun. 7, 2001.
EP Supplementary Search Report mailed Dec. 17, 2009 in EP application 07791179.0.
EP Supplementary Search Report mailed Dec. 29, 2009 in EP application 07806137.1.
U.S. Office Action mailed Feb. 17, 2011 in related U.S. Appl. No. 12/442,218.
U.S. Office Action mailed Jul. 29, 2011 in related U.S. Appl. No. 12/293,895.
Notice of Allowance mailed Mar. 7, 2011 in related U.S. Appl. No. 12/293,895.
International Preliminary Report on Patentability mailed Jul. 2, 2009 in PCT Application No. PCT/JP2007/073231.
English translation of the International Preliminary Report on Patentability mailed Oct. 30, 2008 in PCT Application No. PCT/JP2007/053037.
International Search Report for PCT/JP2007/053037, mailed Mar. 27, 2007.
English translation of the International Preliminary Report on Patentability mailed Oct. 29, 2009 in corresponding PCT Application No. PCT/JP2007/074635.
International Preliminary Report on Patentability mailed Mar. 26, 2009 in corresponding PCT Application No. PCT/JP2007/064448.
International Preliminary Report on Patentability mailed Apr. 9, 2009 in PCT Application No. PCT/JP2007/066658.
International Search Report for PCT/JP2007/066658, mailed Dec. 4, 2007.
Jisaki et al, "Development of transflective LCD for high contrast and wide viewing angle by using homeotropic alignment", Asia Display/IDW '01, pp. 133-136.
KR Notice of Reasons for Rejection and English translation thereof mailed Apr. 25, 2006 in corresponding Korean application No. 10-2004-0110955.
Jignesh Gandhi et al., "Performance Enhancement of reflective CMOS Twistes Nematic Disp Projection Applications Using Compensating Films", pp. 1-6, reprinted from http://www.hanoah.com/publications/sid99 paper Jignesh final pdf. (1999).
Thomson-CSFILR-Jan. 2000, "Optical compensation for displays".
U.S. Office Action mailed Nov. 14, 2008 in U.S. Appl. No. 12/081,752.
Final U.S. Office Action mailed Apr. 30, 2009 in U.S. Appl. No. 12/081,752.
International Search Report for PCT/JP2007/064448 mailed Aug. 21, 2007.
English translation of the International Preliminary Report on Patentability mailed Jan. 7, 2010 in corresponding PCT Application No. PCT/ JP2008/001350.

Notice of Allowance mailed Jul. 11, 2011 in U.S. Appl. No. 12/443/015.

Final Office Action mailed Jul. 20, 2011 in U.S. Appl. No. 12/440,791.

International Search Report for PCT/JP2007/073231, mailed Feb. 12, 2008.

U.S. Appl. No. 11/997,563, filed Feb. 1, 2008, naming Masumi Kubo, as inventor.

U.S. Appl. No. 12/293,895, filed Sep. 22, 2008, naming Masaaki Saitoh et al., as inventors.

* cited by examiner

FIG.13
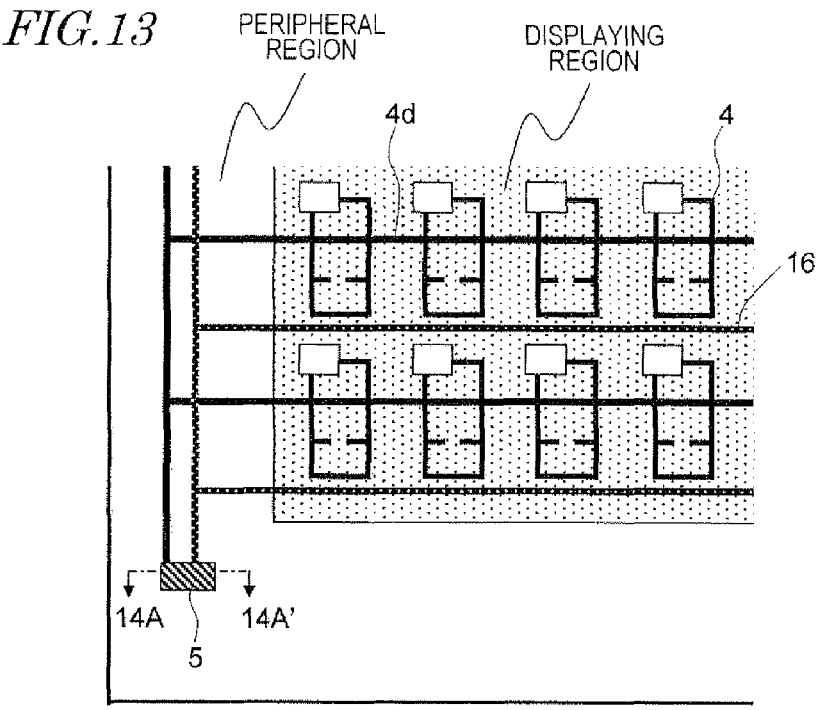
FIG.14
(a)
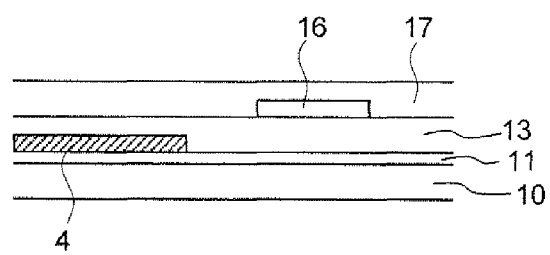
(b)
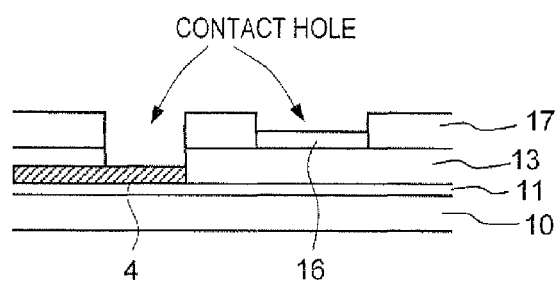
(c)
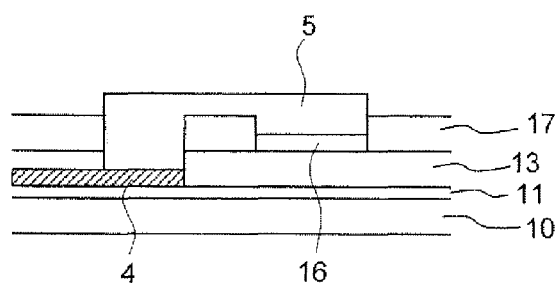

LIQUID CRYSTAL DISPLAY HAVING PARTICULAR AUXILIARY ELECTRODE

This application is the U.S. national phase of International Application No. PCT/JP2007/073231 filed 30 Nov. 2007, which designated the U.S. and claims priority to Japan Application No. 2006-339795 filed 18 Dec. 2006, the entire contents of each of which are hereby incorporated by reference.

TECHNICAL FIELD

The present invention relates to a liquid crystal display device, and in particular to a liquid crystal display device which is suitably used in mobile information terminals (e.g., PDAs), mobile phones, liquid crystal displays for vehicle mounting, digital cameras, personal computers, amusement devices, television sets, and the like.

BACKGROUND ART

In recent years, on the strength of being thin and having a low power consumption, liquid crystal display devices are broadly used in laptop-type personal computers, mobile phones, information devices such as electronic organizers, camera-integrated VTRs having a liquid crystal monitor, and the like.

As a display mode which can realize a high contrast and a wide viewing angle, a vertical alignment mode utilizing a vertical-alignment type liquid crystal layer is drawing attention. In general, a vertical-alignment type liquid crystal layer is formed by using a liquid crystal material having negative dielectric anisotropy and vertical alignment films.

For example, Patent Document 1 discloses a liquid crystal display device whose viewing angle characteristics are improved by allowing an oblique electric field to be generated near an aperture that is provided in a counter electrode, and around a liquid crystal molecule within the aperture which is in a vertical alignment state, allowing the surrounding liquid crystal molecules to take an inclined orientation.

However, with the construction described in Patent Document 1, it is difficult to form an oblique electric field across the entire region within the pixel. This leads to a problem in that regions in which the liquid crystal molecules have a slow response to voltage occur within the pixel, thus causing an afterimage phenomenon.

In order to solve this problem, Patent Document 2 discloses a technique in which, regularly-arranged apertures are provided in the pixel electrode or the counter electrode to form a plurality of liquid crystal domains exhibiting axisymmetric orientation within the pixel.

Furthermore, Patent Document 3 discloses a technique of providing an auxiliary electrode for stably performing orientation control with an oblique electric field on an active matrix substrate. This auxiliary electrode is provided in a position corresponding to a slit which is formed in a pixel electrode. Moreover, this auxiliary electrode is formed integrally with a storage capacitor electrode for constituting a storage capacitor, and is formed concurrently with and from the same metal film as the gate lines, in a step of forming the gate lines.

[Patent Document 1] Japanese Laid-Open Patent Publication No. 6-301036
[Patent Document 2] Japanese Laid-Open Patent Publication No. 2000-47217
[Patent Document 3] Japanese Laid-Open Patent Publication No. 2006-184334

DISCLOSURE OF INVENTION

Problems to be Solved by the Invention

However, since the auxiliary electrode disclosed in Patent Document 3 is made of a metal film, it lowers the aperture ratio of the pixel and decreases light transmittance. In order to solve this problem, it may be possible to compose the auxiliary electrode from a transparent ITO film. In this case, however, extra steps such as deposition and patterning of an ITO film (which needs to be separately formed in addition to the ITO film for composing the pixel electrode) must be provided, thus resulting in an increased number of steps.

The present invention has been made in view of the above problems, and an objective thereof is to stably perform orientation control with an oblique electric field in a liquid crystal display device of the vertical alignment mode, and suppress decrease in light transmittance without much increase in the number of production steps.

Means for Solving the Problems

A liquid crystal display device according to the present invention is a liquid crystal display device comprising a first substrate, a second substrate provided so as to oppose the first substrate, and a vertical-alignment type liquid crystal layer provided between the first substrate and the second substrate, the liquid crystal display device having a plurality of pixels each including: a switching element which is provided on the first substrate and at least includes a semiconductor layer; a pixel electrode electrically connected to the switching element; a counter electrode opposing the pixel electrode; and the liquid crystal layer interposed between the pixel electrode and the counter electrode, the pixel electrode including at least one aperture or recessed portion formed at a predetermined position in the pixel, and in each of the pixels, when at least a predetermined voltage is applied across the liquid crystal layer, a plurality of regions being created where liquid crystal molecules tilt in respectively different azimuthal directions, wherein, the first substrate includes an auxiliary electrode to which a different potential from that for the pixel electrode is applied; and the auxiliary electrode includes a portion overlapping at least one aperture or recessed portion of the pixel electrode, and is made of a same film as the semiconductor layer of the switching element.

In a preferred embodiment, the auxiliary electrode further includes a portion located near an outer periphery of the pixel electrode.

In a preferred embodiment, in each of the plurality of pixels, a plurality of liquid crystal domains each exhibiting an axisymmetric orientation are created when at least a predetermined voltage is applied across the liquid crystal layer.

In a preferred embodiment, a potential which is substantially the same as that for the counter electrode is applied to the auxiliary electrode.

In a preferred embodiment, the switching element is a thin film transistor whose channel region is a portion of the semiconductor layer.

In a preferred embodiment, the semiconductor layer and the auxiliary electrode are made of amorphous silicon or crystalline silicon.

In a preferred embodiment, the auxiliary electrode has a light transmittance of 60% or more.

In a preferred embodiment, the first substrate includes a storage capacitor line; and the auxiliary electrode is electrically connected to the storage capacitor line.

In a preferred embodiment, the first substrate includes a connection electrode for electrically connecting the auxiliary electrode and the storage capacitor line; and the connection electrode is provided outside a displaying region which is defined by the plurality of pixels.

In a preferred embodiment, the first substrate includes a connection electrode for electrically connecting the auxiliary electrode and the storage capacitor line; the connection electrode is provided in each of the plurality of pixels; and the auxiliary electrode partially overlaps the storage capacitor line.

In a preferred embodiment, the connection electrode is disposed so that the entire connection electrode overlaps the storage capacitor line.

In a preferred embodiment, the first substrate includes a signal line; and the connection electrode is made of a same film as the signal line.

Effects of the Invention

A liquid crystal display device according to the present invention has an auxiliary electrode which includes a portion overlapping an aperture or recessed portion of a pixel electrode. By applying a different potential from that for the pixel electrode to the auxiliary electrode, the intensity of an orientation restriction force due to an oblique electric field which is generated in the aperture or recessed portion can be controlled. For example, an oblique electric field whose equipotential lines dip more steeply in the aperture or recessed portion can be generated, whereby a strong orientation restriction force can be obtained. As a result, it is possible to stably perform orientation control with an oblique electric field. Since the auxiliary electrode is made of the same film as the semiconductor layer of the switching element, it is possible to suppress decrease in light transmittance without much increase in the number of production steps.

BRIEF DESCRIPTION OF DRAWINGS

FIG. 13 A diagram showing a manner of electrical connection between auxiliary electrodes and storage capacitor lines in the liquid crystal display device 200.

FIG. 14 (a) to (c) are step-by-step cross-sectional views schematically showing steps of forming a connection electrode in the liquid crystal display device 200.

Figure 1:
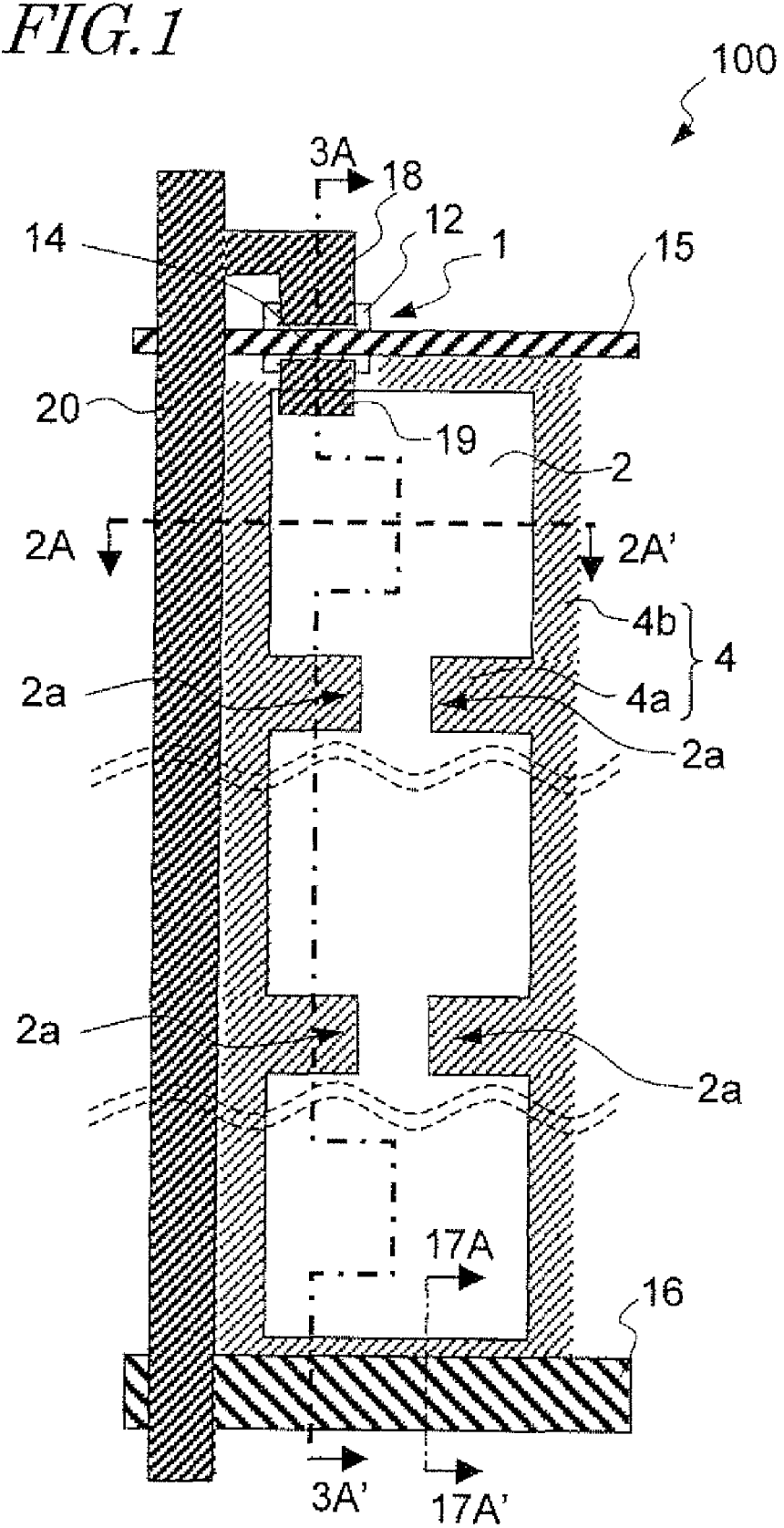
FIG. 1 An upper plan view schematically showing a liquid crystal display device 100 according to a preferred embodiment of the present invention.

DESCRIPTION OF REFERENCE NUMERALS 1, 1' thin film transistor (switching element)
2 pixel electrode 2a recessed portion
2T transparent electrode
2R reflection electrode
3 counter electrode
4 auxiliary electrode
4a portion of auxiliary electrode (portion overlapping recessed portion of pixel electrode)
4b portion of auxiliary electrode (portion located near outer periphery of pixel electrode)
4c portion of auxiliary electrode (portion overlapping electrically-conductive film of pixel electrode)
4d portion of auxiliary electrode (portion connected to auxiliary electrode of adjoining pixel)
5 connection electrode
6 protrusion
10, 30 transparent substrate
11 basecoat film
12 semiconductor layer
13 gate insulating film
14 gate electrode
15 scanning line
16 storage capacitor line
17 first interlayer insulating film
18 source electrode
19 drain electrode
20 signal line
21 second interlayer insulating film
22, 33 vertical alignment film
23, 34 polarizer
31 color filter
32 light shielding layer (black matrix)
50 liquid crystal layer
51 liquid crystal molecules
60 active matrix substrate
70 counter substrate (color filter substrate)
100, 100', 200, 200' liquid crystal display device
300, 400 liquid crystal display device

BEST MODE FOR CARRYING OUT THE INVENTION

Hereinafter, with reference to the drawings, embodiments of the present invention will be described. Note that the present invention is not limited to the following embodiments.

Embodiment 1

Figure 2:
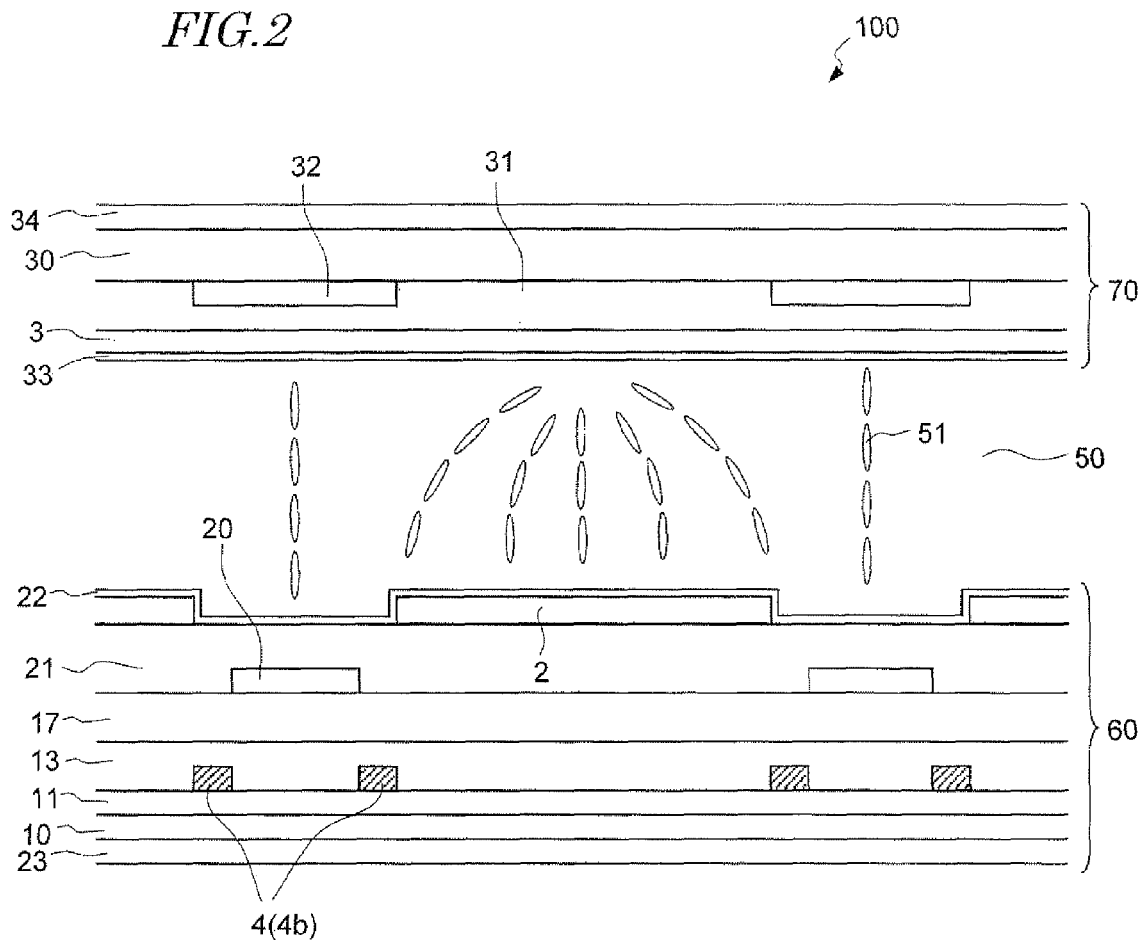
FIG. 2 A cross-sectional view schematically showing a liquid crystal display device 100 according to a preferred embodiment of the present invention, showing a cross section along line 2A-2A' in FIG. 1.
Figure 3:
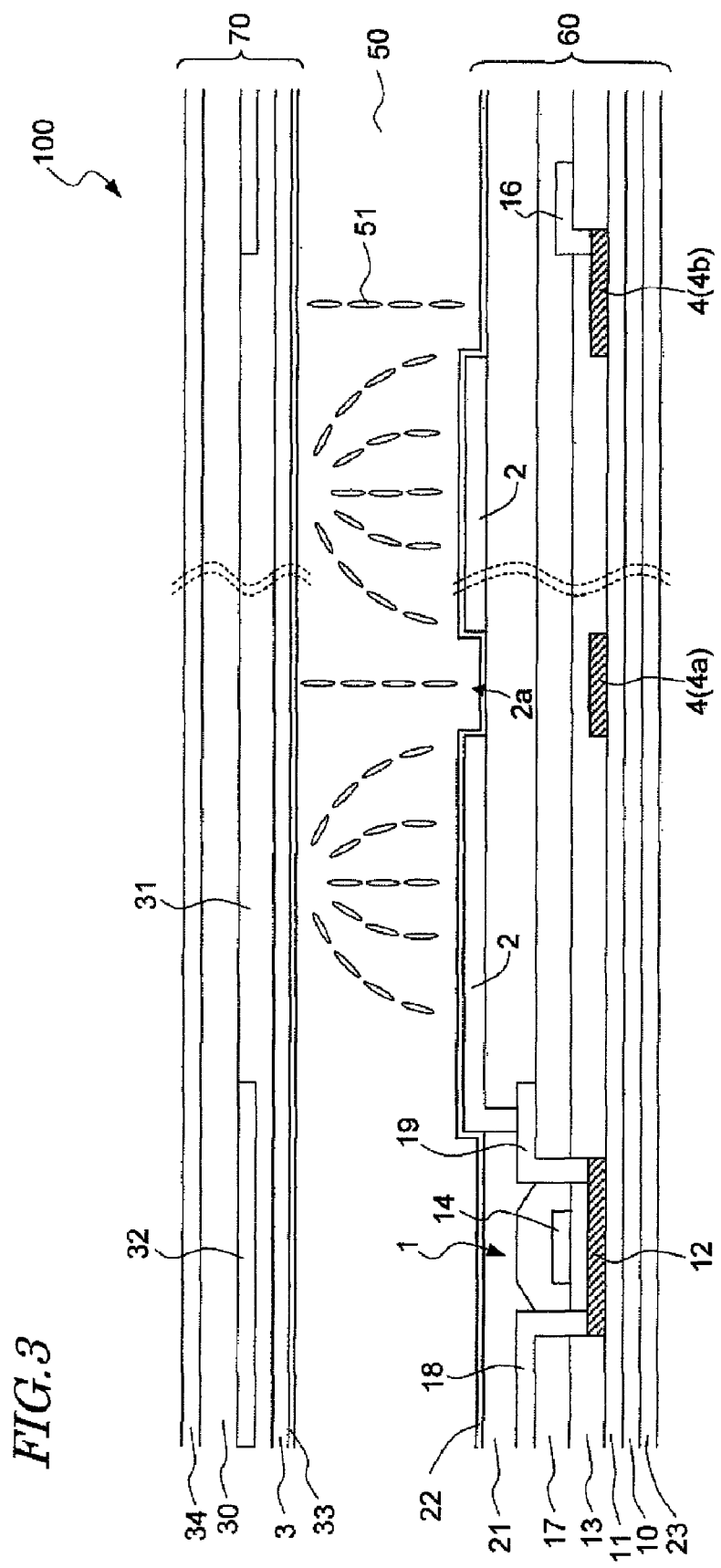
FIG. 3 A cross-sectional view schematically showing the liquid crystal display device 100 according to a preferred embodiment of the present invention, showing a cross section along line 3A-3A' in FIG. 1.

With reference to FIG. 1 to FIG. 3, the structure of a liquid crystal display device 100 according to the present embodiment will be described. FIG. 1 is an upper plan view schematically showing a region corresponding to one pixel of the liquid crystal display device 100. FIG. 2 and FIG. 3 are cross-sectional views along lines 2A-2A' and 3A-3A' in FIG. 1, respectively.

The liquid crystal display device 100 includes an active matrix substrate 60, a counter substrate (color filter substrate) 70 provided so as to oppose the active matrix substrate 60, and a vertical-alignment type liquid crystal layer 50 provided therebetween.

Each of the plurality of pixels of the liquid crystal display device 100 includes a thin film transistor (TFT) 1 provided on the active matrix substrate 60, a pixel electrode 2 electrically connected to the thin film transistor 1, a counter electrode 3 opposing the pixel electrode 2, and a liquid crystal layer 50 interposed between the pixel electrode 2 and the counter electrode 3.

Hereinafter, the more specific structure of the active matrix substrate 60 and the counter substrate 70 will be described.

The active matrix substrate 60 includes a transparent substrate (e.g., a glass substrate or a plastic substrate) 10 supporting its component elements. A basecoat film 11 is formed on a surface of the transparent substrate 10 closer to the liquid crystal layer 50, and a semiconductor layer 12 of continuous grain silicon (CGS) is formed on the basecoat film 11. A portion of the semiconductor layer 12 functions as a channel region of the thin film transistor 1, and other portions function as a source region and a drain region.

A gate insulating film 13 is formed so as to cover the semiconductor layer 12. A gate electrode 14, a scanning line 15, and a storage capacitor line 16 are formed on the gate insulating film 13, and a first interlayer insulating film 17 is formed so as to cover them.

On the first interlayer insulating film 17, a source electrode 18, a drain electrode 19, and a signal line 20 are formed. In contact holes which are formed in the gate insulating film 13 and the first interlayer insulating film 17, the source electrode 18 and the drain electrode 19 are connected to the semiconductor layer 12.

A second interlayer insulating film 21 is formed so as to cover the source electrode 18, the drain electrode 19, and the signal line 20, and a pixel electrode 2 is provided on the second interlayer insulating film 21. The second interlayer insulating film 21 is an organic insulating film made of an acrylic type photosensitive resin or the like, for example. The pixel electrode 2 is made of a transparent electrically conductive material (e.g. ITO). On a surface of the transparent substrate 10 opposite from the liquid crystal layer 50, a polarizer 23 is provided.

On a surface of the transparent substrate 30 closer to the liquid crystal layer 50, the counter substrate 70 includes a color filter 31, a light shielding layer (also referred to as a black matrix) 32, and the counter electrode in this order. The counter electrode 3 is made of a transparent electrically conductive material (e.g. ITO). On a surface of the transparent substrate 30 opposite from the liquid crystal layer 50, a polarizer 34 is provided.

The liquid crystal layer 50 interposed between the active matrix substrate 60 and the counter substrate 70 is made of a nematic liquid crystal material having a negative dielectric anisotropy, and contains a chiral agent as necessary. On surfaces of the active matrix substrate 60 and the counter substrate 70 that are in contact with the liquid crystal layer 50, vertical alignment films 22 and 33 are provided. The vertical alignment films 22 and 33 cause liquid crystal molecules 51 in the liquid crystal layer 50 to be aligned substantially perpendicular to their surfaces. The vertical alignment films 22 and 33 are made of polyimide resin, for example.

A pixel electrode 2 of the liquid crystal display device 100 includes a plurality of recessed portions 2a formed at predetermined positions in the pixel. In the present embodiment, four recessed portions 2a are provided in the pixel electrode 2, and the pixel is divided into three regions by the recessed portions 2a. The individual regions divided by the recessed portions 2a are also referred to as subpixels.

When a predetermined potential difference is given between the pixel electrode 2 and the counter electrode 3 (i.e., a predetermined voltage is applied across the liquid crystal layer 50), an oblique electric field (a potential gradient which is tilted with respect to the substrate surface) is generated near the outer periphery of the pixel electrode 2 and at the recessed portions 2a, and this oblique electric field defines the directions in which the liquid crystal molecules 51 fall. Due to the action of the oblique electric field, a plurality of (herein three)

liquid crystal domains are created each exhibiting an axisymmetric orientation. In each liquid crystal domain, the liquid crystal molecules 51 are orientated in almost all azimuthal directions, and thus, when a voltage is applied across the liquid crystal layer 50, a plurality of regions are formed in which the liquid crystal molecules 51 are tilted in respectively different azimuthal directions in the liquid crystal display device 100.

Figure 4:
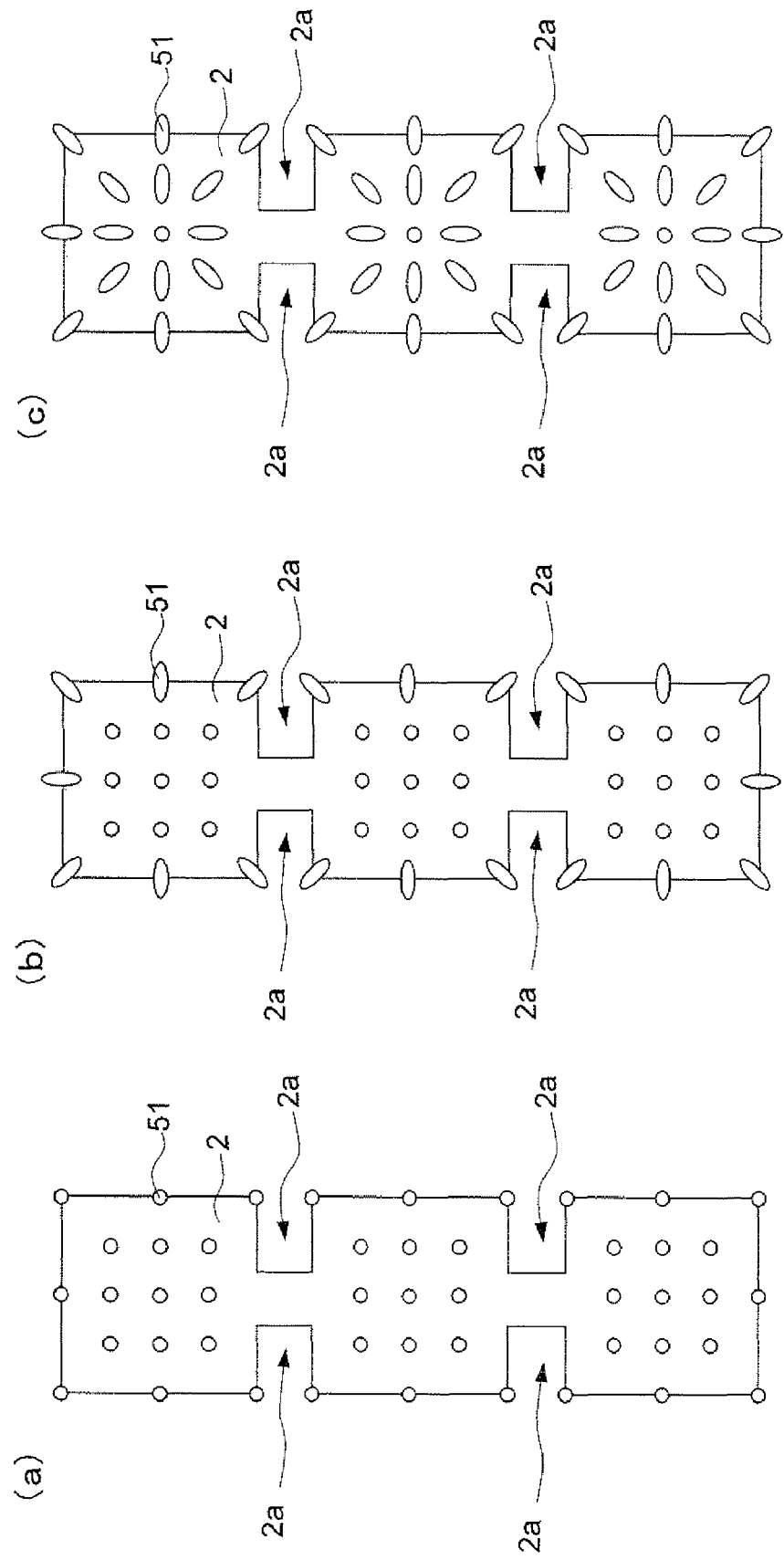
FIG. 4 (a) to (c) are diagrams schematically showing orientations of liquid crystal molecules, where: (a) shows an orientation in the absence of an applied voltage; (b) shows an orientation immediately after voltage application; and (c) shows an orientation when a sufficient time has elapsed since voltage application.

With reference to FIG. 4, the mechanism by which axisymmetric orientations are created will be described more specifically. FIGS. 4(a) to (c) are diagrams schematically showing orientations of the liquid crystal molecules 51, where: FIG. 4(a) shows a state in the absence of an applied voltage; FIG. 4(b) shows a state immediately after voltage application; and FIG. 4(c) shows a state when a sufficient time has elapsed since voltage application.

As shown in FIG. 4(a), in the absence of an applied voltage, the liquid crystal molecules 51 are orientated substantially perpendicularly to the substrate surface due to the orientation restriction forces of the vertical alignment films 22 and 33.

Under an applied voltage, the liquid crystal molecules 51 having a negative dielectric anisotropy are tilted so that their molecular major axes are perpendicular to the electric lines of force (i.e., parallel to the equipotential lines), and therefore, the directions in which the liquid crystal molecules 51 fall are defined by an oblique electric field which is generated near the outer periphery of and at the recessed portions 2a of the pixel electrode 2. Therefore, as shown in FIG. 4(b), the liquid crystal molecules 51 in the region where the oblique electric field is generated (i.e., the liquid crystal molecules 51 which directly receive the orientation restriction force due to the oblique electric field) are the first to be tilted.

Thereafter, with lapse of time, the other liquid crystal molecules 51 will be orientated in continuous manners (so as to match the orientations of the liquid crystal molecules 51 that were the first to be tilted), whereby liquid crystal domains as shown in FIG. 4(c) are formed. Since the liquid crystal molecules 51 are orientated in almost all azimuthal directions (all azimuthal directions within the substrate plane) in each liquid crystal domain, the liquid crystal display device 100 has excellent viewing angle characteristics.

Herein, "axisymmetric orientation" is synonymous with "radially-inclined orientation" in Patent Document 1. Around the center axis of axisymmetric orientation, the liquid crystal molecules 51 are continuously oriented without forming disclination lines, and the major axes of the liquid crystal molecules 51 are oriented in a radial, tangential, or spiral manner. In either case, the major axes of the liquid crystal molecules 51 have components which are radially-inclined from the center of orientation (components which are parallel to the oblique electric field).

Note that it is not necessary that a plurality of recessed portions 2a be provided as is exemplified herein; it suffices if at least one recessed portion 2a is provided. For example, in the case where a pixel is divided into two regions, liquid crystal domains with axisymmetric orientations can be created by providing only one oblong recessed portion 2a. Moreover, an aperture may be provided instead of a recessed portion 2a (or in addition to a recessed portion 2a). In the case where an aperture is provided in the pixel electrode 2, as in the case of a recessed portion 2a, an oblique electric field is formed in any aperture surrounded by the electrically-conductive film of the pixel electrode 2, thus defining the directions in which the liquid crystal molecules 51 are tilted due to an electric field.

Next, the construction of the liquid crystal display device 100 according to the present embodiment will be described in more detail.

As shown in FIG. 1 to FIG. 3, the active matrix substrate 60 of the liquid crystal display device 100 includes auxiliary electrodes 4 to which a different potential from that for the pixel electrode 2 is applied. As shown in FIG. 3, an auxiliary electrode 4 in the present embodiment is connected to the storage capacitor line 16 through a contact hole which is formed in the gate insulating film 13, whereby a potential (e.g., the same potential as that for the counter electrode 3 as will be described later) which is different from that for the pixel electrode 2 can be applied to the auxiliary electrode 4.

As shown in FIG. 1, an auxiliary electrode 4 includes portions 4a which overlap the recessed portions 2a of the pixel electrode 2, and a portion 4b which is located near the outer periphery of the pixel electrode 2. Moreover, the auxiliary electrode 4 is made of the same film as the semiconductor layer 12 of the thin film transistor 1. In other words, the auxiliary electrode 4 is formed concurrently with the semiconductor layer 12 by patterning the semiconductor film for forming the semiconductor layer 12 of the thin film transistor 1.

The liquid crystal display device 100 of the present embodiment includes auxiliary electrodes 4 as described above. By applying a different potential from that for the pixel electrode 2 to each auxiliary electrode 4, it becomes possible to control the intensity of the orientation restriction force due to an oblique electric field. Hereinafter, this point will be described in more detail.

Figure 5:
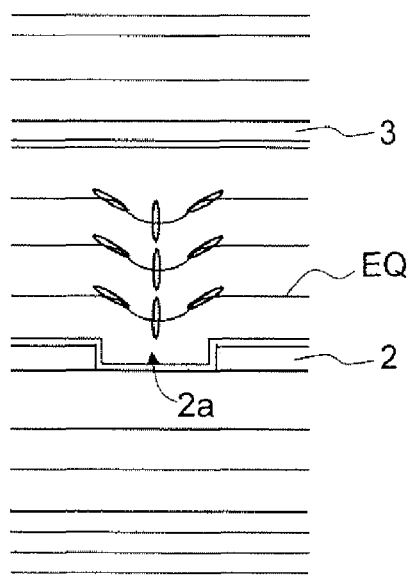
FIG. 5 A diagram showing, by using equipotential lines, an electric field which is created when a voltage is applied across a liquid crystal layer, illustrating a case where no auxiliary electrode is provided.
Figure 6:
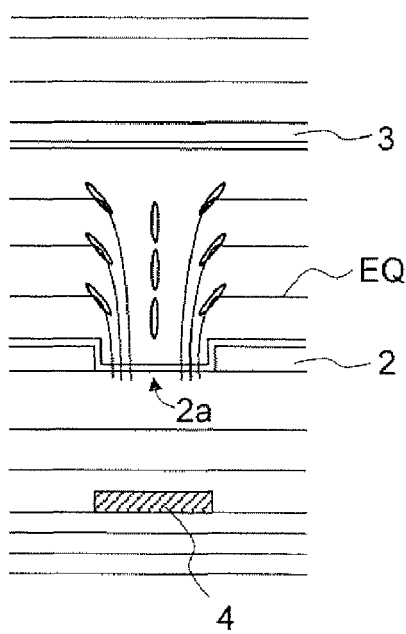
FIG. 6 A diagram showing, by using equipotential lines, an electric field which is created when a voltage is applied across a liquid crystal layer, illustrating a case where substantially the same potential as that for a counter electrode is applied to an auxiliary electrode.

FIG. 5 and FIG. 6 are diagrams showing, by using equipotential lines EQ, electric fields which are created when a voltage is applied across the liquid crystal layer 50. FIG. 5 illustrates a case where auxiliary electrodes 4 are not provided, whereas FIG. 6 illustrates a case where substantially the same potential as that for the counter electrode 3 is applied to an auxiliary electrode 4.

When a voltage is applied across the liquid crystal layer 50, as shown in FIG. 5 and FIG. 6, a potential gradient which is represented by equipotential lines (which are orthogonal to electric lines of force) EQ is created. The equipotential lines EQ run parallel to the substrate surface in the liquid crystal layer 50 which is interposed between the electrically-conductive film of the pixel electrode 2 (i.e., the portion excluding the recessed portions 2a) and the counter electrode 3, and dip in any region corresponding to the neighborhood of the outer periphery of and the recessed portions 2a of the pixel electrode 2. Therefore, in the liquid crystal layer 50 in any region corresponding to the neighborhood of the outer periphery of and the recessed portions 2a of the pixel electrode 2, an oblique electric field which is represented by tilted equipotential lines EQ is created.

In the case where auxiliary electrodes 4 are not provided, as shown in FIG. 5, equipotential lines EQ are continuous between adjoining subpixels, so that the equipotential lines EQ present continuous rises and falls. In other words, a relatively gentle potential gradient is created.

On the other hand, in the case where an auxiliary electrode 4 is provided and substantially the same potential as that for the counter electrode 3 is applied to the auxiliary electrode 4, as shown in FIG. 6, equipotential lines EQ are not continuous between adjoining subpixels, but the equipotential lines EQ abruptly dip above the recessed portion 2a. Therefore, a steep potential gradient is created in the recessed portion 2a, thus resulting in a stronger oblique electric field than that shown in FIG. 5. Therefore, a strong orientation restriction force can be obtained.

As described above, since the liquid crystal display device 100 in the present embodiment includes the auxiliary electrodes 4, orientation control can be stably performed with an oblique electric field. Moreover, since the auxiliary electrodes 4 are made of the same film as the semiconductor layer 12 of the thin film transistor 1, a high light transmittance can be provided. For example, an auxiliary electrode 4 which is made of continuous grain silicon (CGS) can realize a light transmittance of about 80% with a thickness of about 50 nm. Furthermore, since the auxiliary electrodes 4 are made of the same film as the semiconductor layer 12 of the thin film transistor 1, hardly any new steps for providing the auxiliary electrodes 4 are needed. Therefore, it is possible to suppress decrease in light transmittance without much increase in the number of production steps.

The present embodiment illustrates as a switching element the thin film transistor 1 including the semiconductor layer 12 which is made of continuous grain silicon; however, the switching element is not limited thereto. The semiconductor layer 12 may be made of crystalline silicon such as continuous grain silicon or polycrystalline silicon, or made of amorphous silicon.

Figure 7:
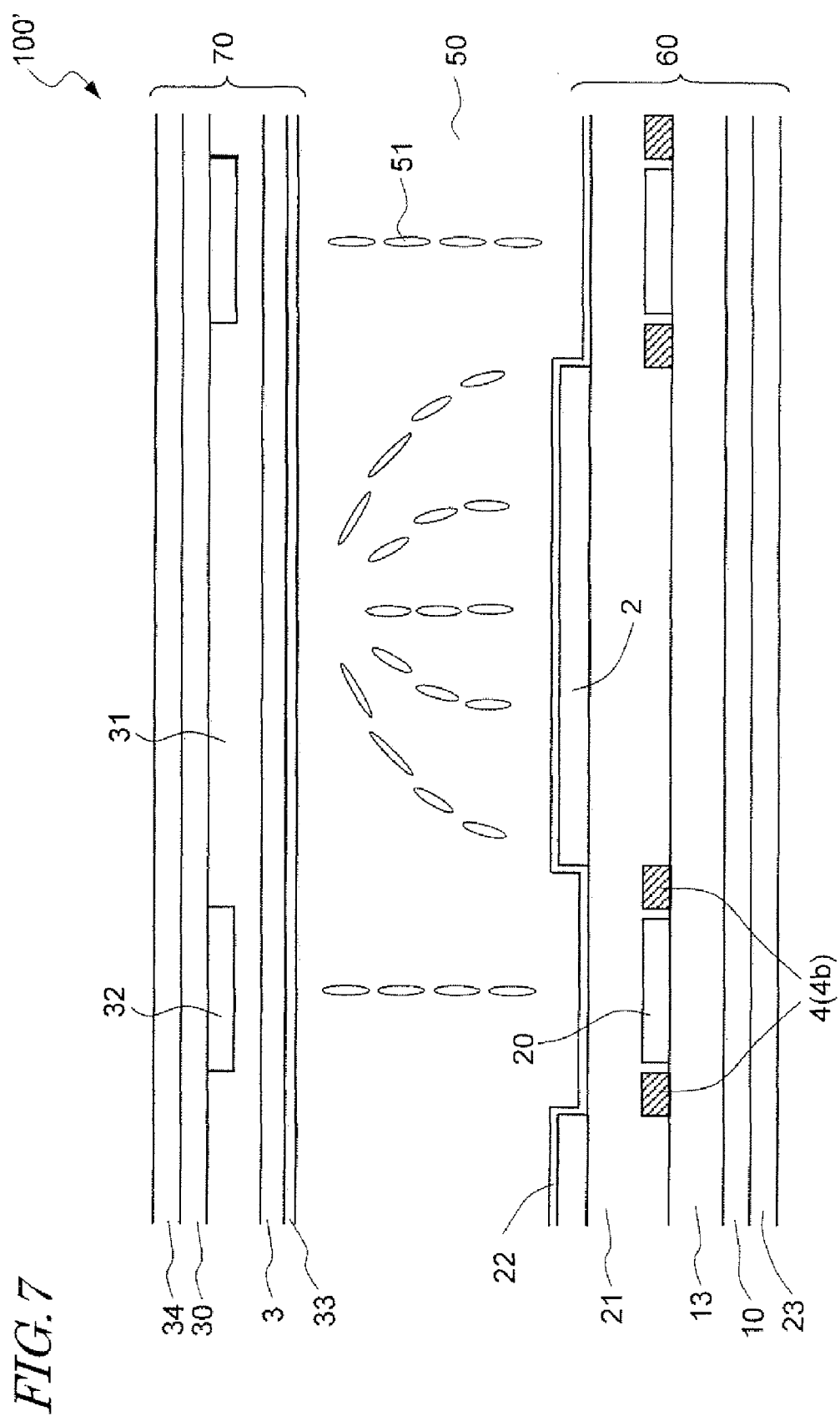
FIG. 7 A cross-sectional view schematically showing a liquid crystal display device 100' according to a preferred embodiment of the present invention.
Figure 8:
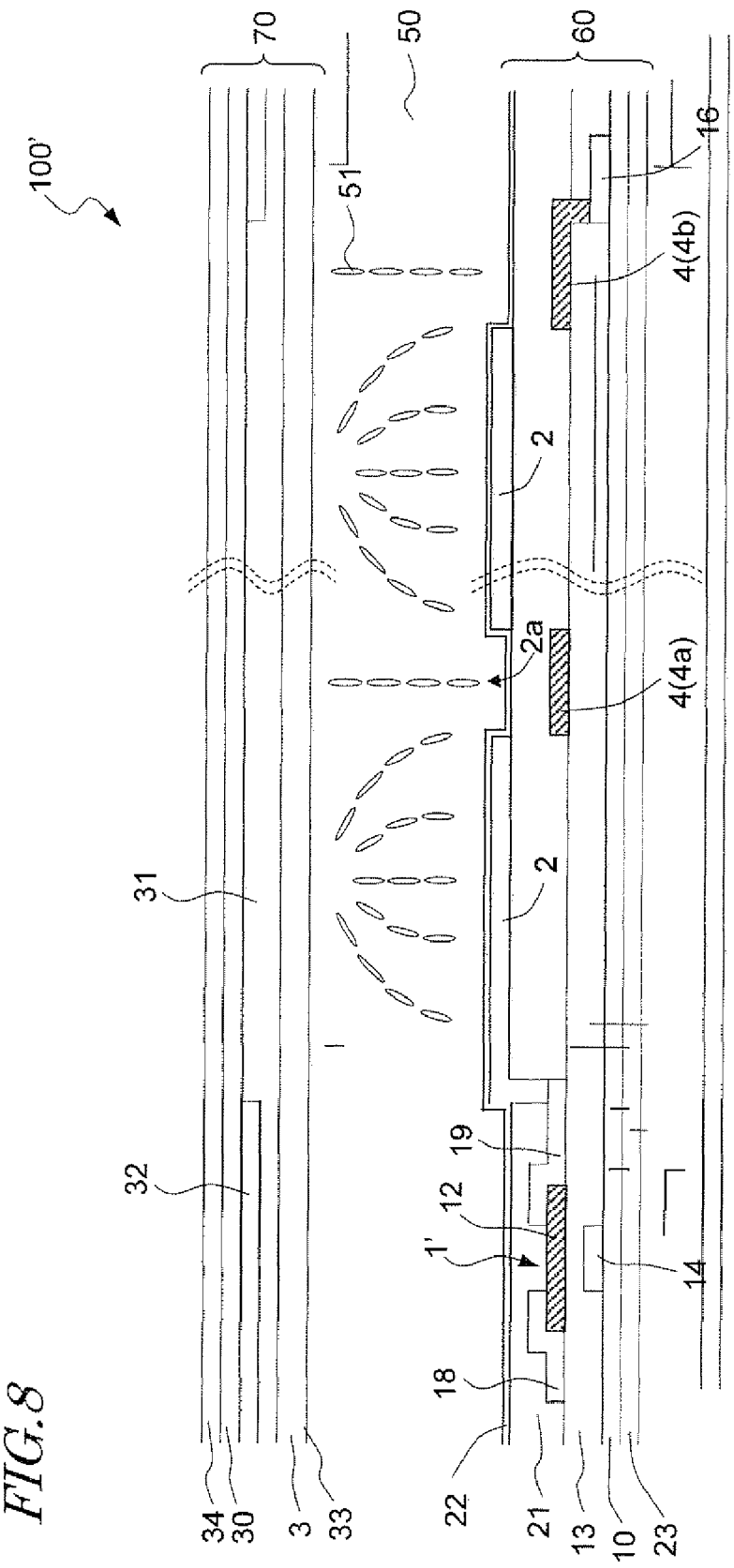
FIG. 8 A cross-sectional view schematically showing the liquid crystal display device 100' according to a preferred embodiment of the present invention.

FIG. 7 and FIG. 8 show a liquid crystal display device 100' having thin film transistors 1' including a semiconductor layer 12 which is made of amorphous silicon. The liquid crystal display device 100 shown in FIG. 2 and FIG. 3 has the top-gate type thin film transistors 1 including the semiconductor layer 12 made of continuous grain silicon, whereas the liquid crystal display device 100' shown in FIG. 7 and FIG. 8 has the bottom-gate type thin film transistors 1' including the semiconductor layer 12 made of amorphous silicon.

The liquid crystal display device 100' also includes auxiliary electrodes 4 made of the same film as the semiconductor layer 12 of the thin film transistor 1' (i.e., made of amorphous silicon). Therefore, effects similar to those of the liquid crystal display device 100 are obtained. The thickness of the auxiliary electrode 4 made of amorphous silicon is about 35 nm, for example.

Note that, in each of the liquid crystal display devices 100 and 100', the thickness of the auxiliary electrodes 4 is not limited to the exemplified value. However, in order to sufficiently suppress decrease in the light transmittance of a pixel, the auxiliary electrodes 4 are preferably formed with a thickness such that it has a light transmittance of 60% or more, and more preferably 80% or more. An auxiliary electrode 4 made of crystalline silicon can realize a light transmittance of 80% or more with a thickness of 60 nm or less, and a light transmittance of 60% or more with a thickness of 114 nm or less. Note that the semiconductor layer 12 of the switching element and the auxiliary electrodes 4 do not need to have the same thickness, and they may have respectively different thicknesses. However, from the standpoint of suppressing increase in the number of steps, it is preferable that they have almost the same thickness.

Figure 9:
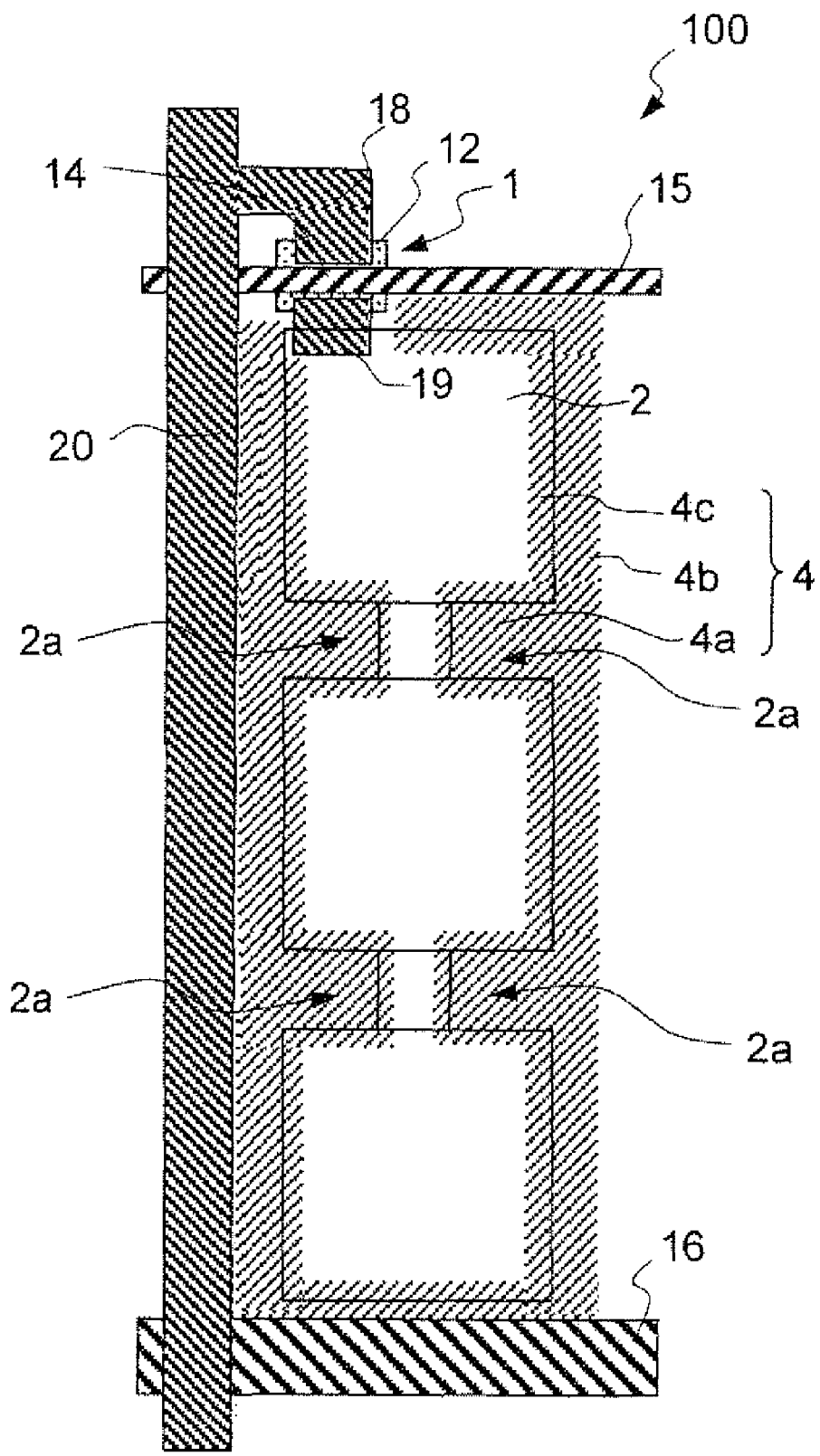
FIG. 9 An upper plan view schematically showing a liquid crystal display device 100 according to a preferred embodiment of the present invention.

FIG. 1 to FIG. 3, FIG. 7, and FIG. 8 illustrate constructions where the electrically-conductive film of a pixel electrode 2 and an auxiliary electrode 4 do not overlap each other. However, as shown in FIG. 9, the auxiliary electrode 4 may include portions 4c which overlap the electrically-conductive film of the pixel electrode 2, and the region where each portion 4c overlaps the pixel electrode 2 may be used as a portion of a storage capacitor.

Embodiment 2

Figure 10:
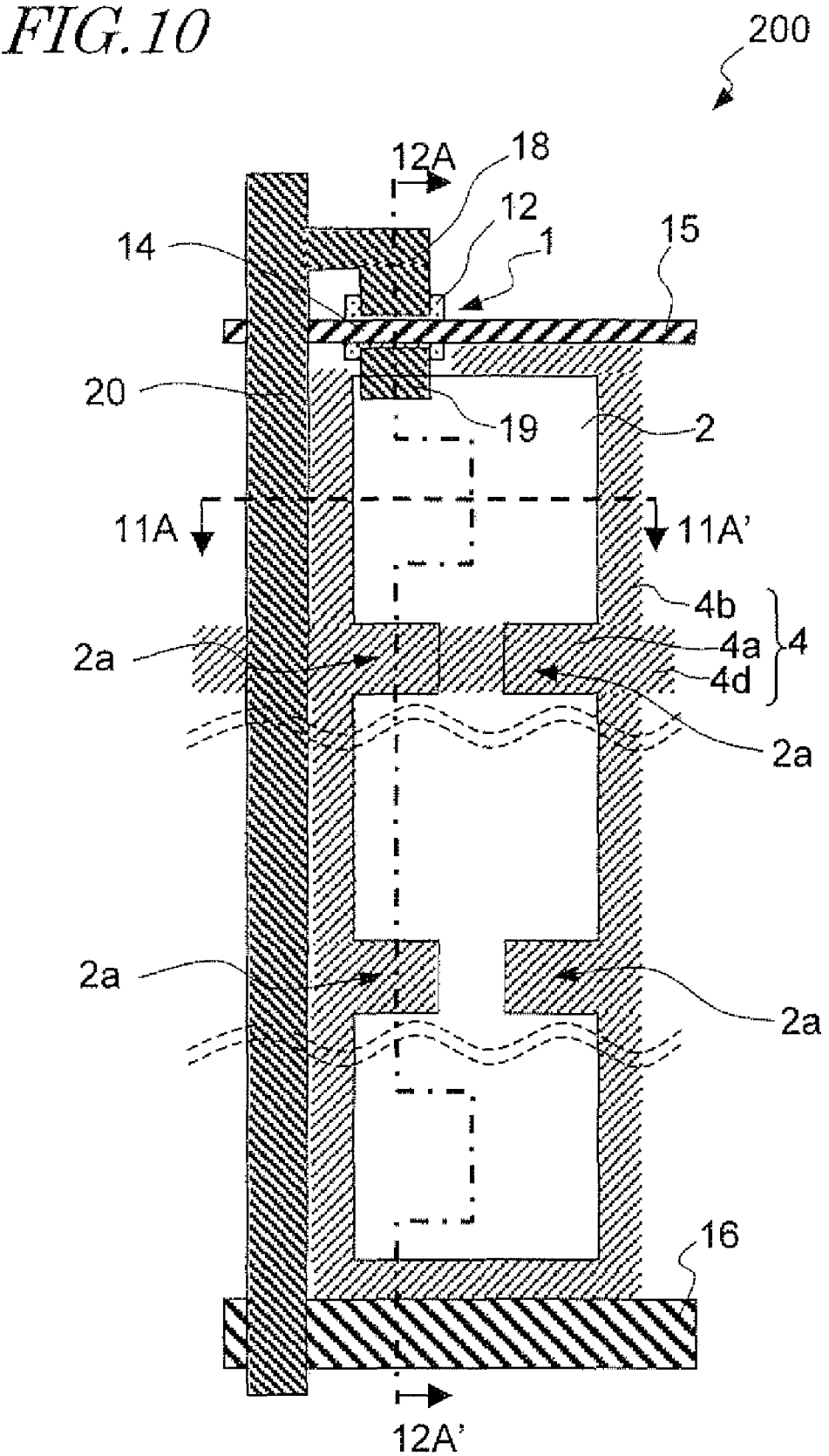
FIG. 10 An upper plan view schematically showing a liquid crystal display device 200 according to a preferred embodiment of the present invention.
Figure 11:
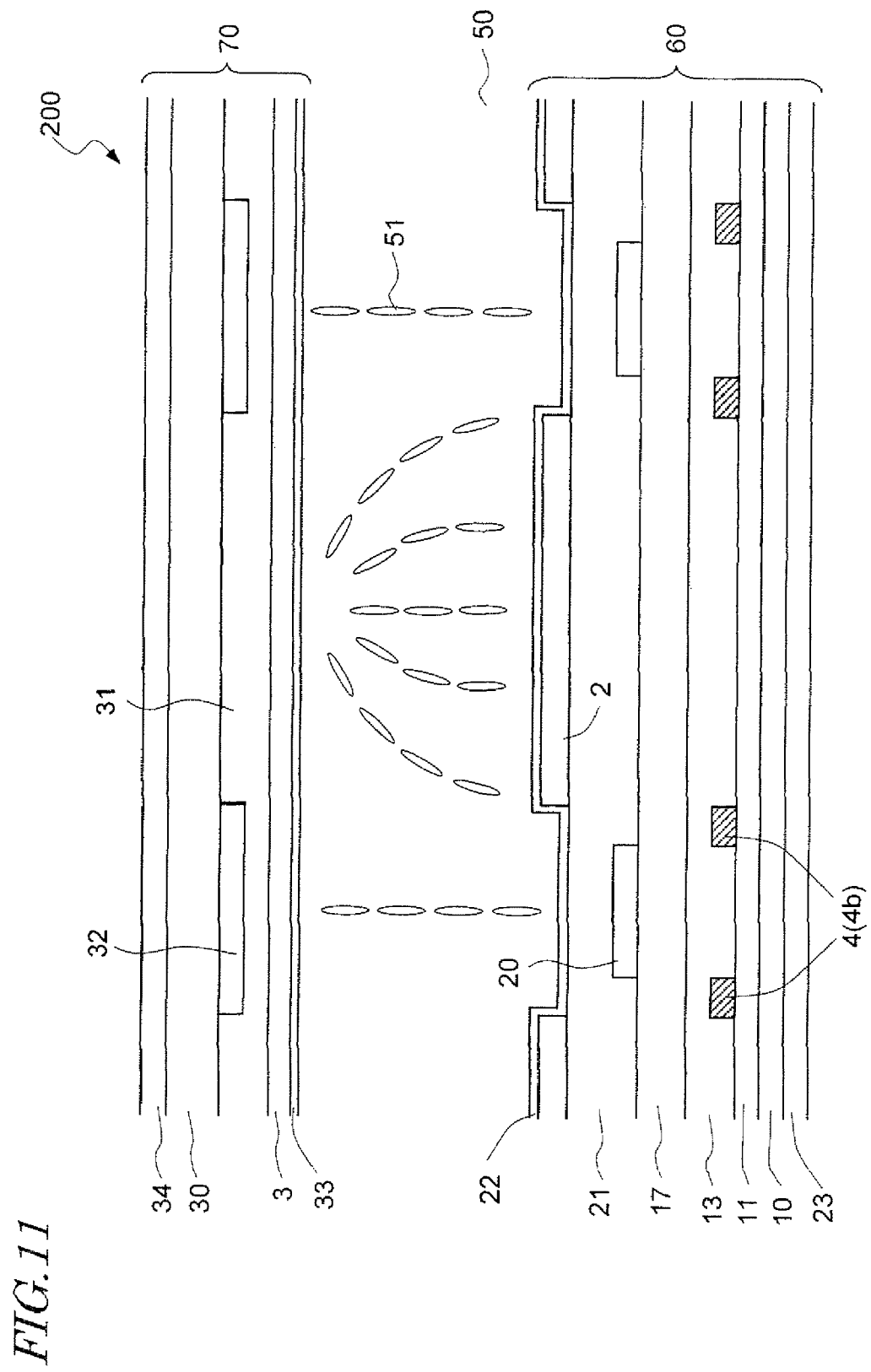
FIG. 11 A cross-sectional view schematically showing the liquid crystal display device 200 according to a preferred embodiment of the present invention, showing a cross section along line 11A-11A' in FIG. 10.
Figure 12:
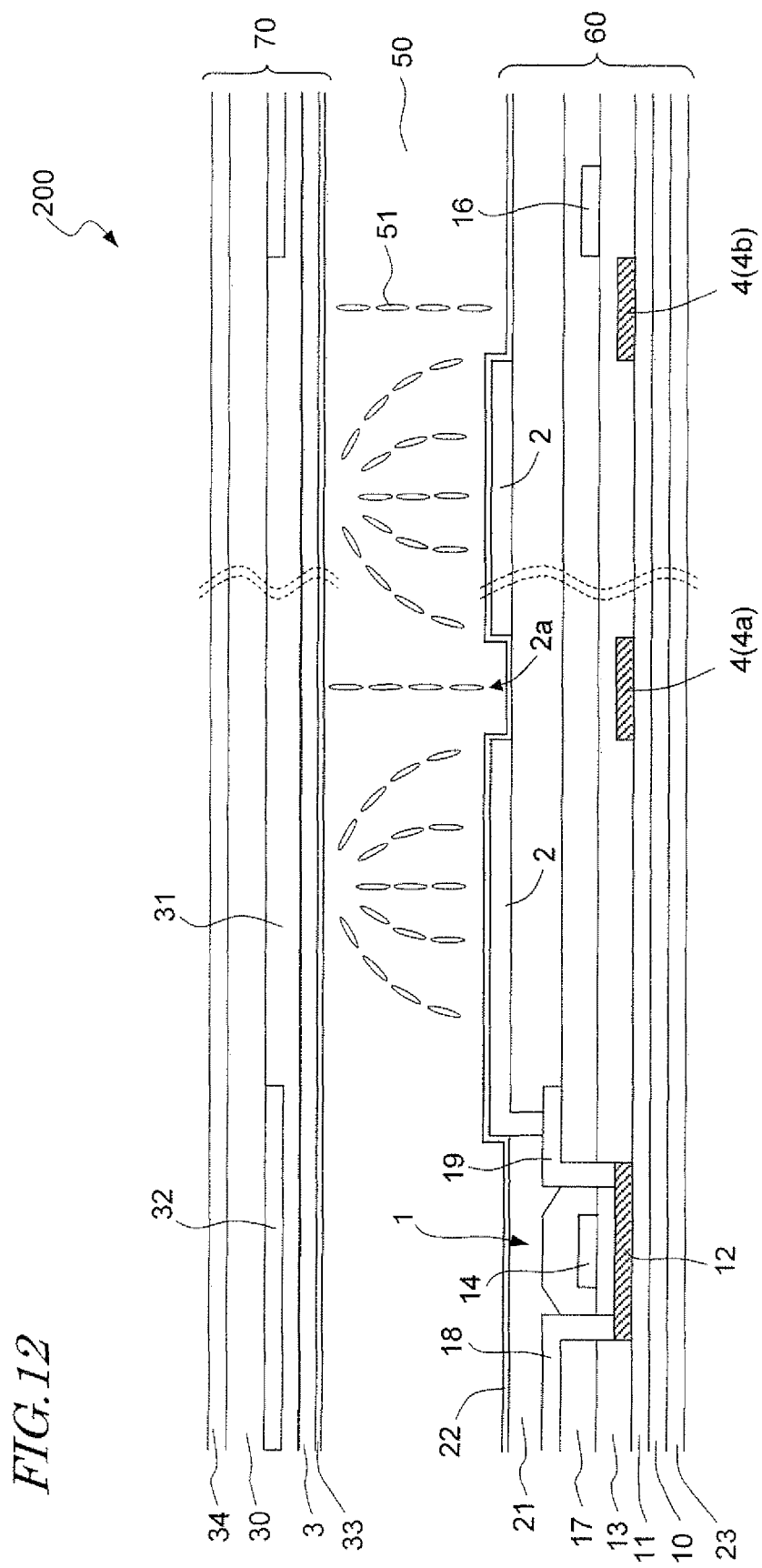
FIG. 12 A cross-sectional view schematically showing the liquid crystal display device 200 according to a preferred embodiment of the present invention, showing a cross section along line 12A-12A' in FIG. 10.

With reference to FIG. 10 to FIG. 12, the structure of a liquid crystal display device 200 according to the present embodiment will be described. FIG. 10 is an upper plan view schematically showing a region corresponding to one pixel of the liquid crystal display device 200. FIG. 11 and FIG. 12 are cross-sectional views taken along line 11A-11A' and line 12A-12A' in FIG. 10, respectively.

As shown in FIG. 10 to FIG. 12, the liquid crystal display device 200 includes auxiliary electrodes 4 which are made of the same film as the semiconductor layer 12 of the thin film transistors 1, and therefore is able to stably perform orientation control with an oblique electric field, and suppress decrease in light transmittance while suppressing increase in the number of steps.

However, the liquid crystal display device 200 of the present embodiment differs from the liquid crystal display device 100 of Embodiment 1 in terms of the manner of electrical connection between an auxiliary electrode 4 and a storage capacitor line 16. In the liquid crystal display device 100, as is also shown in FIG. 3, an auxiliary electrode 4 is connected to a storage capacitor line 16 through a contact hole which is provided in the gate insulating film 13, thus being electrically connected to the storage capacitor line 16 within each pixel.

On the other hand, in the liquid crystal display device 200, as can also be seen from FIG. 12, the auxiliary electrode 4 is not connected to the storage capacitor line 16 within the pixel. The auxiliary electrode 4 in the present embodiment is electrically connected to the storage capacitor line 16 outside a displaying region which is defined by a plurality of pixels (also referred to as the peripheral region).

Specifically, as shown in FIG. 13, each auxiliary electrode 4 includes a portion 4d which is connected to the auxiliary electrode 4 of an adjoining pixel, and a plurality of auxiliary electrodes 4 which are mutually connected via the portions 4d are electrically connected to the storage capacitor line 16 via a connection electrode 5 which is provided outside the displaying region (peripheral region).

The connection electrode 5 in the present embodiment is made of the same film as the signal line 20. The connection electrode 5 is formed as shown in FIGS. 14(a) to (c). FIGS. 14(a) to (c) are step-by-step cross-sectional views showing steps of forming the connection electrode 5, corresponding to a cross section along 14A-14A' in FIG. 13.

FIG. 14(a) shows, in the steps of producing the active matrix substrate 60, a state where the basecoat film 11, the auxiliary electrodes 4, the gate insulating film 13, the storage capacitor lines 16, and the first interlayer insulating film 17 have been stacked on the transparent substrate 10.

After the first interlayer insulating film 17 is deposited, the gate insulating film 13 and the first interlayer insulating film 17 above the portions of the semiconductor layer 12 to become source regions and gate regions are removed, whereby contact holes are formed. At this time, as shown in FIG. 14(b), contact holes are also formed outside the displaying region. Specifically, outside the displaying region, two contact holes are formed by removing the gate insulating film 13 and the first interlayer insulating film 17 above an auxiliary electrode 4 and the first interlayer insulating film 17 above a storage capacitor line 16.

Thereafter, by depositing an electrically-conductive film on the first interlayer insulating film 17 and then patterning the electrically-conductive film, the source electrodes 18, the drain electrodes 19, and the signal lines 20 are formed. At this time, as shown in FIG. 14(c), the connection electrode 5 is also formed.

As shown in FIG. 3, in the case where the auxiliary electrode 4 and the storage capacitor line 16 are connected within the pixel through a contact hole which is formed in the gate insulating film 13, a step of forming the contact hole in the gate insulating film 13 is required. On the other hand, in the case where the connection electrode 5 is formed in the above-described manner, it is possible to electrically connect the auxiliary electrodes 4 and the storage capacitor lines 16 without adding any steps. Moreover, since the connection electrode 5 is provided outside the displaying region, the connection electrode 5 will not deteriorate the light transmittance of the pixels.

Also in the present embodiment, the thin film transistor 1 including the semiconductor layer 12 which is made of continuous grain silicon is illustrated a switching element; however, the switching element is not limited thereto. The semiconductor layer 12 may be made of crystalline silicon such as continuous grain silicon or polycrystalline silicon, or made of amorphous silicon.

Figure 15:
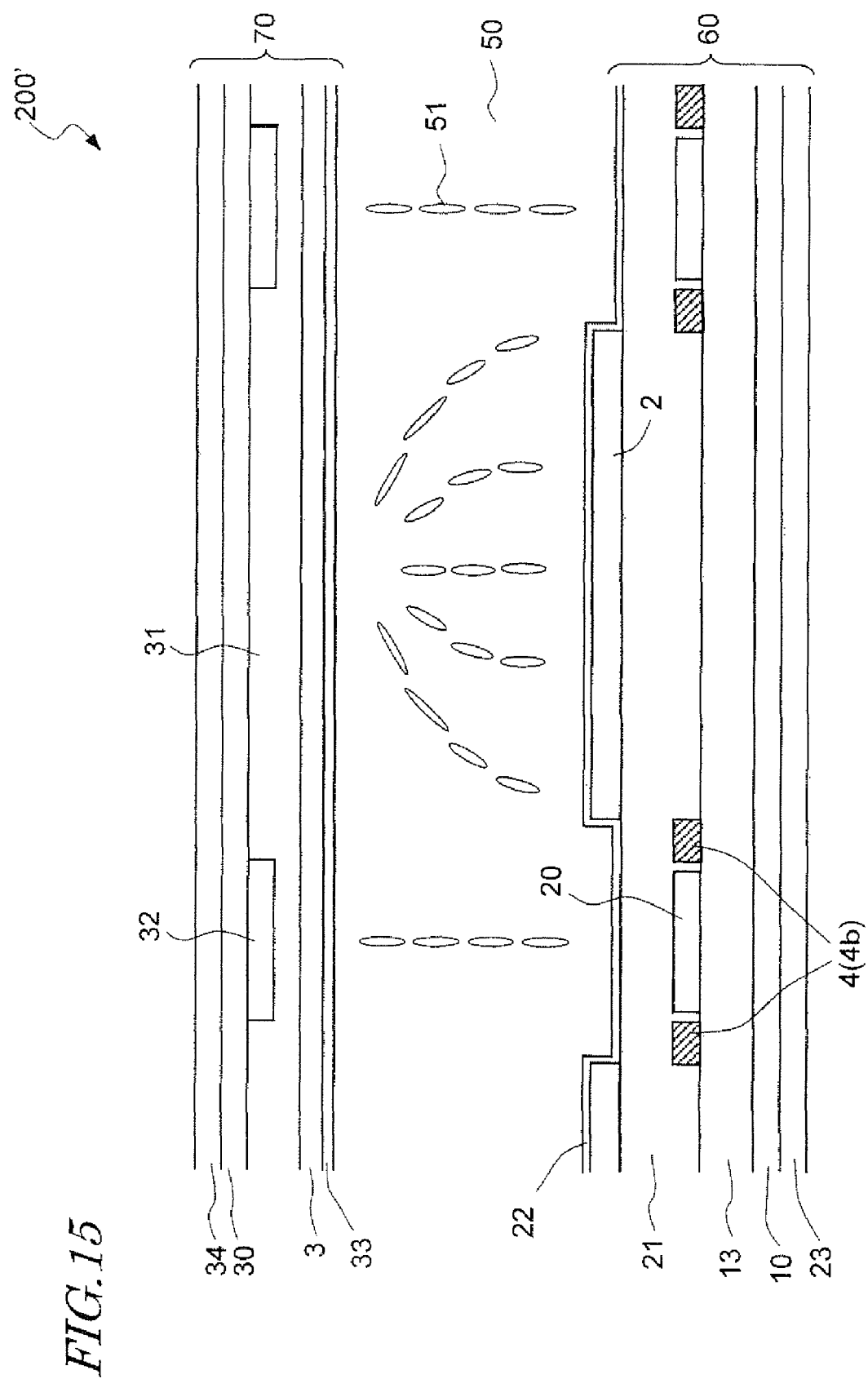
FIG. 15 A cross-sectional view schematically showing a liquid crystal display device 200' according to a preferred embodiment of the present invention.
Figure 16:
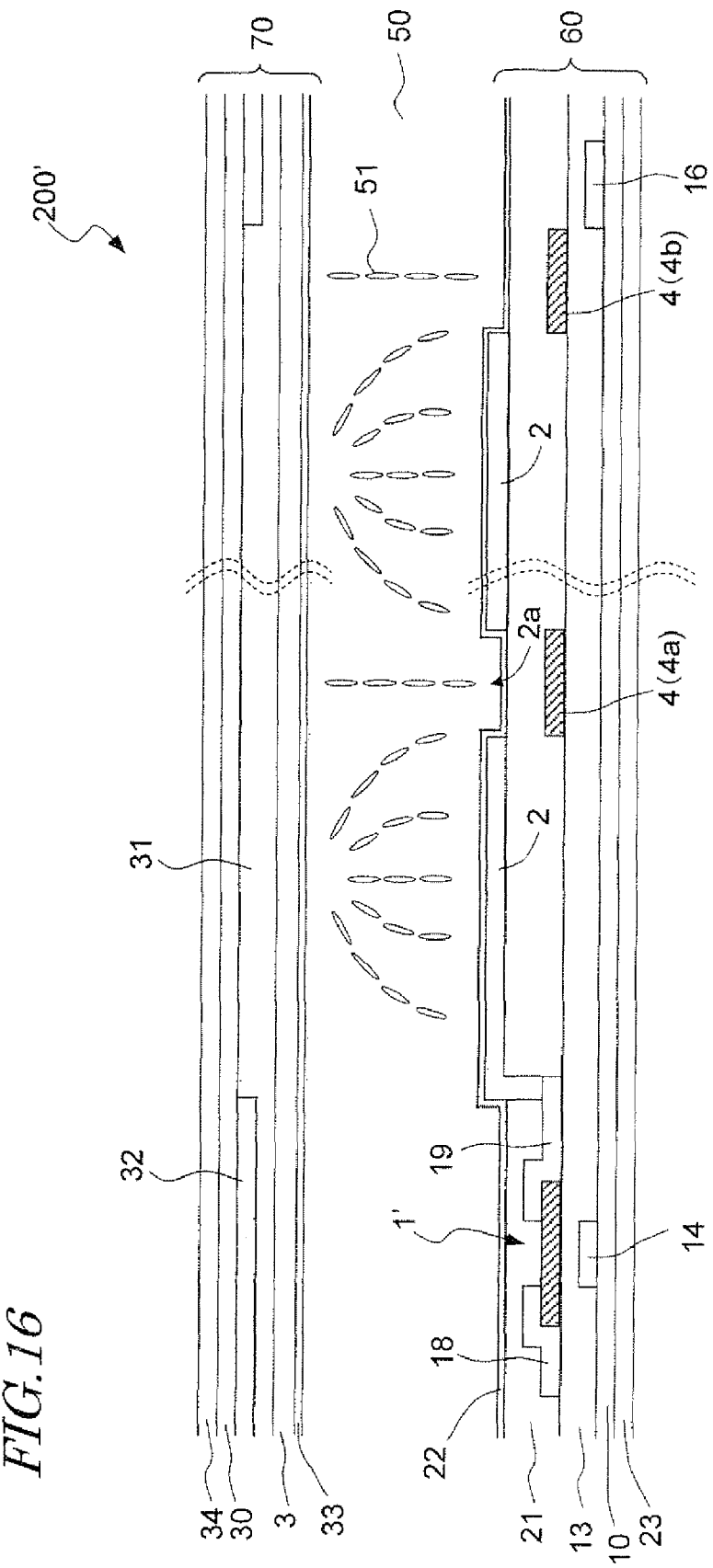
FIG. 16 A cross-sectional view schematically showing the liquid crystal display device 200' according to a preferred embodiment of the present invention.

FIG. 15 and FIG. 16 show a liquid crystal display device 200' having a thin film transistor 1' including a semiconductor layer 12 which is made of amorphous silicon. The liquid crystal display device 200 shown in FIG. 11 and FIG. 12 has the top-gate type thin film transistors 1 including the semiconductor layer 12 made of continuous grain silicon, whereas the liquid crystal display device 200' shown in FIG. 15 and FIG. 16 has the bottom-gate type thin film transistors 1' including the semiconductor layer 12 made of amorphous silicon.

The liquid crystal display device 200' also includes auxiliary electrodes 4 which are made of the same film as the semiconductor layer 12 of the thin film transistors 1' (i.e., made of amorphous silicon). Therefore, it is possible to stably perform orientation control with an oblique electric field, and also suppress decrease in light transmittance.

In the liquid crystal display device 200', too, as can also be seen from FIG. 16, the auxiliary electrode 4 is not connected to a storage capacitor line 16 within the pixel, but is electrically connected to the storage capacitor line 16 outside the displaying region (peripheral region). In the peripheral region, the auxiliary electrode 4 is connected to a storage capacitor line 16 through contact holes which are provided in the gate insulating film 13, for example. In this case, a step of forming contact holes in the gate insulating film 13 is required. However, under specifications where a portion of the gate insulating film 13 is meant to be removed because of a certain requirement anyway, the auxiliary electrode 4 and the storage capacitor line 16 can be electrically connected without adding any steps, by utilizing the step of patterning the gate insulating film 13 as an opportunity to form the contact holes.

Figure 17:
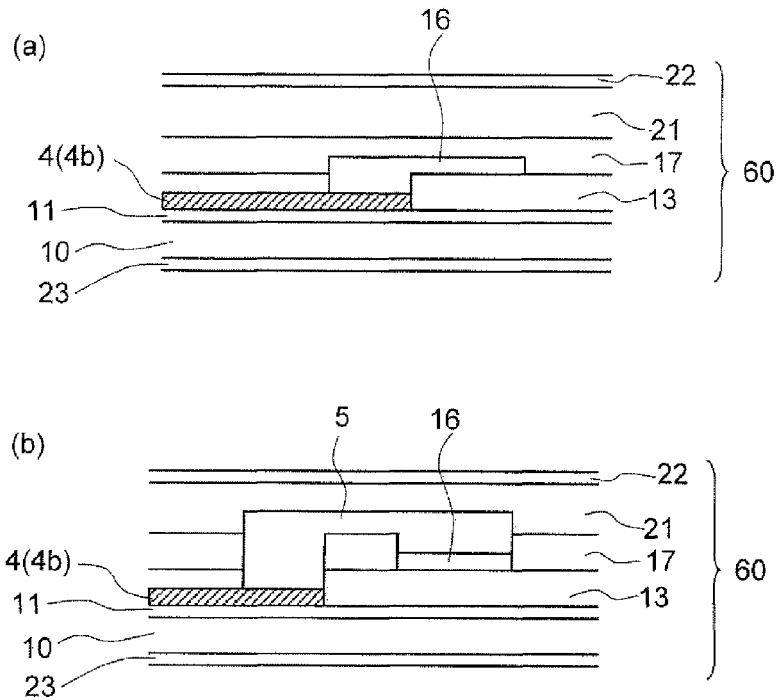
FIGS. 17 (a) and (b) are cross-sectional views showing exemplary constructions for establishing electrical connection between an auxiliary electrode and a storage capacitor line within a pixel.

Note that, in the liquid crystal display device 100 of Embodiment 1, as shown in FIG. 17(a), the auxiliary electrode 4 and the storage capacitor line 16 are directly connected through a contact hole which is provided in the gate insulating film 13 within the pixel. FIG. 17(a) is a cross-sectional view showing the neighborhood of the storage capacitor line 16 in FIG. 3, corresponding to a cross section along line 17A-17A' in FIG. 1. Instead of employing this construction, as shown in FIG. 17(b), a connection electrode 5 which is made of the same film as the signal line 20 may be provided within the pixel, and the auxiliary electrode 4 and the storage capacitor line 16 may be electrically connected with the connection electrode 5. By adopting such a construction, without adding any steps, the auxiliary electrode 4 and the storage capacitor line 16 can be electrically connected.

Figure 18:
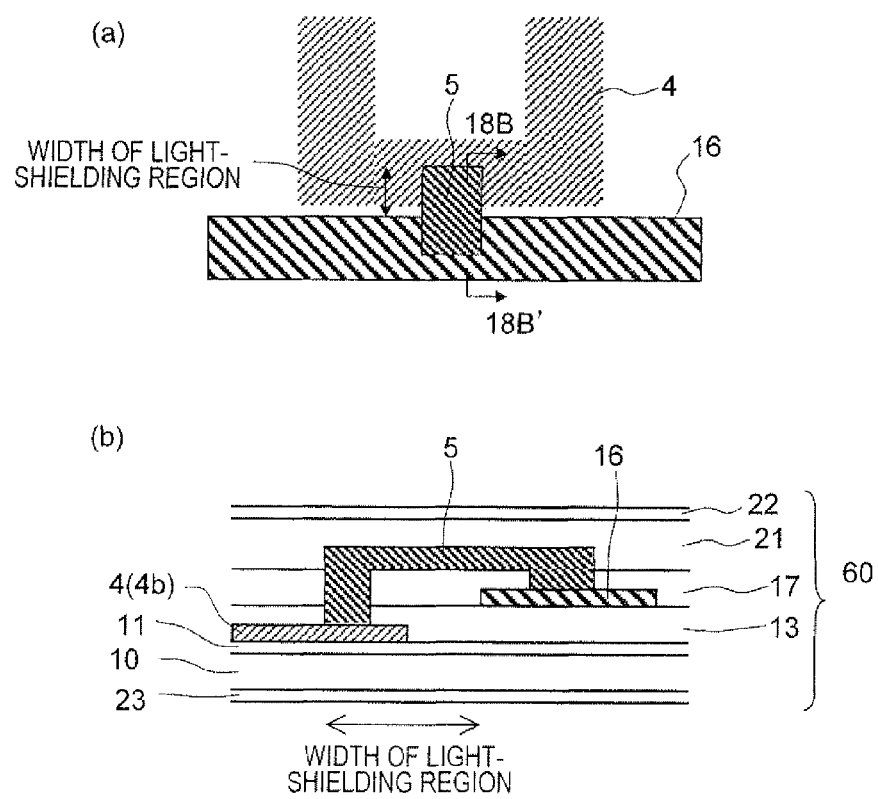
FIG. 18 (a) is an upper plan view showing an exemplary construction for establishing electrical connection between an auxiliary electrode and a storage capacitor line within a pixel; and (b) is a cross-sectional view taken along line 18B-18B' in (a).

However, in the case where a connection electrode 5 is provided within the pixel, the light transmittance of the pixel may be lowered, depending on the relative positioning of the auxiliary electrode 4 and the storage capacitor line 16. For example, as shown in FIGS. 18(a) and (b), if the connection electrode 5 is provided in the case where the auxiliary electrode 4 and the storage capacitor line 16 do not overlap, there will be a region that is shaded by the connection electrode 5, and thus the light transmittance of the pixel will be deteriorated.

Figure 19:
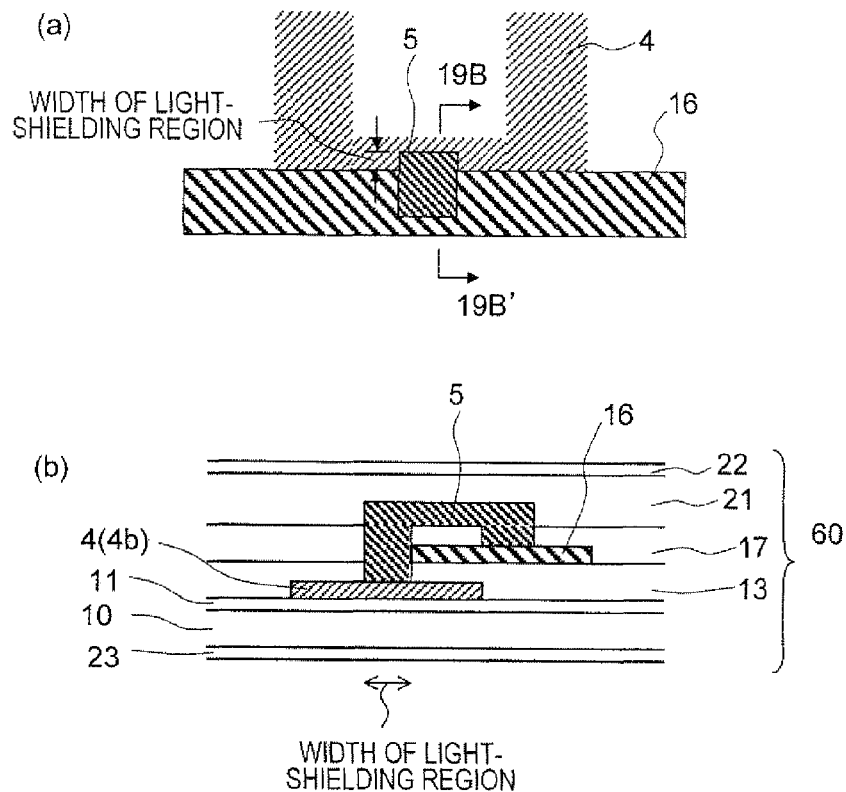
FIG. 19 (a) is an upper plan view showing an exemplary construction for establishing electrical connection between an auxiliary electrode and a storage capacitor line within a pixel; and (b) is a cross-sectional view taken along line 19B-19B' in (a).
Figure 20:
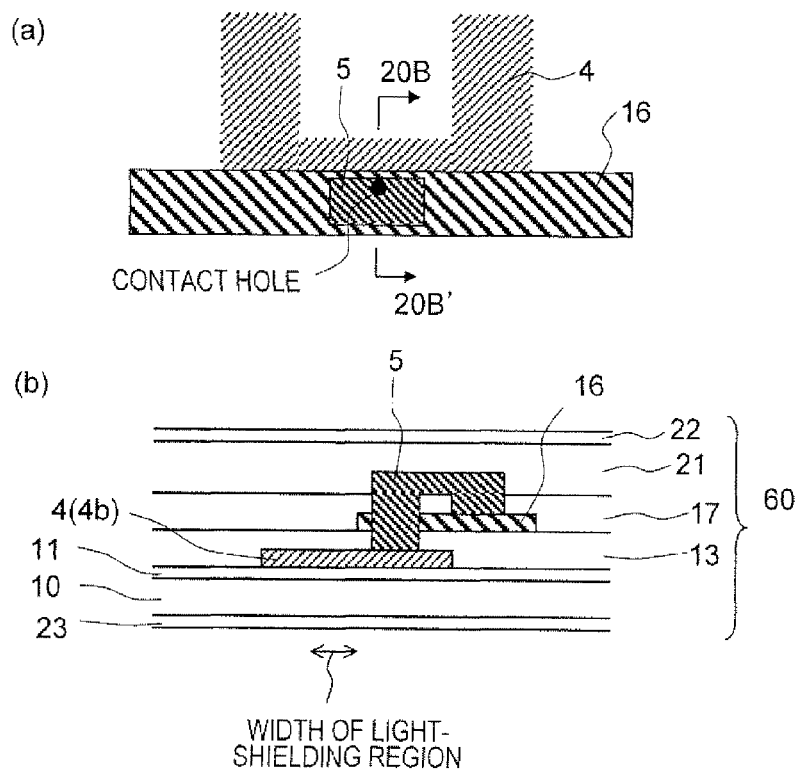
FIG. 20 (a) is an upper plan view showing an exemplary construction for establishing electrical connection between an auxiliary electrode and a storage capacitor line within a pixel; and (b) is a cross-sectional view taken along line 20B-20B' in (a).

On the other hand, in the case where the auxiliary electrode 4 and the storage capacitor line 16 partially overlap, as shown in FIGS. 19(a) and (b), the width of the shaded region can be reduced, thus making it possible to suppress decrease in light transmittance. Moreover, in the case where the auxiliary electrode 4 and the storage capacitor line 16 partially overlap, as shown in FIGS. 20(a) and (b), a contact hole may be formed in the storage capacitor line 16, and the connection electrode 5 may be disposed so that its entirety overlaps the storage capacitor line 16; thus, there will be no shaded region, and lowering of the light transmittance can be prevented.

Embodiment 3

In Embodiments 1 and 2, the present invention has been described by taking a transmission type liquid crystal display device which presents display in the transmission mode as an example. However, the present invention is also suitably used for a transmission/reflection combination type liquid crystal display device which is capable of presenting display in both of the transmission mode and the reflection mode.

Figure 21:
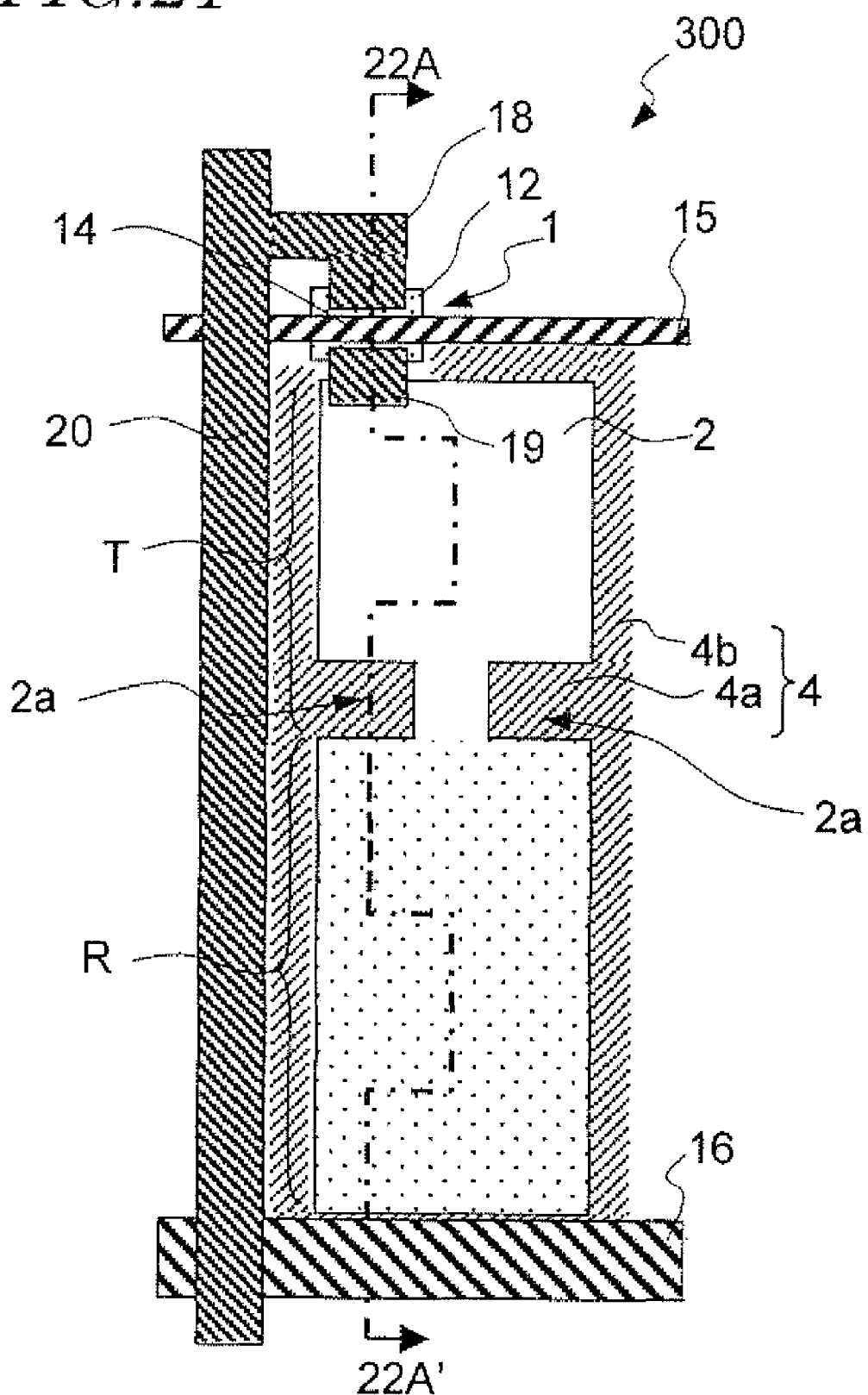
FIG. 21 An upper plan view schematically showing a liquid crystal display device 300 according to a preferred embodiment of the present invention.
Figure 22:
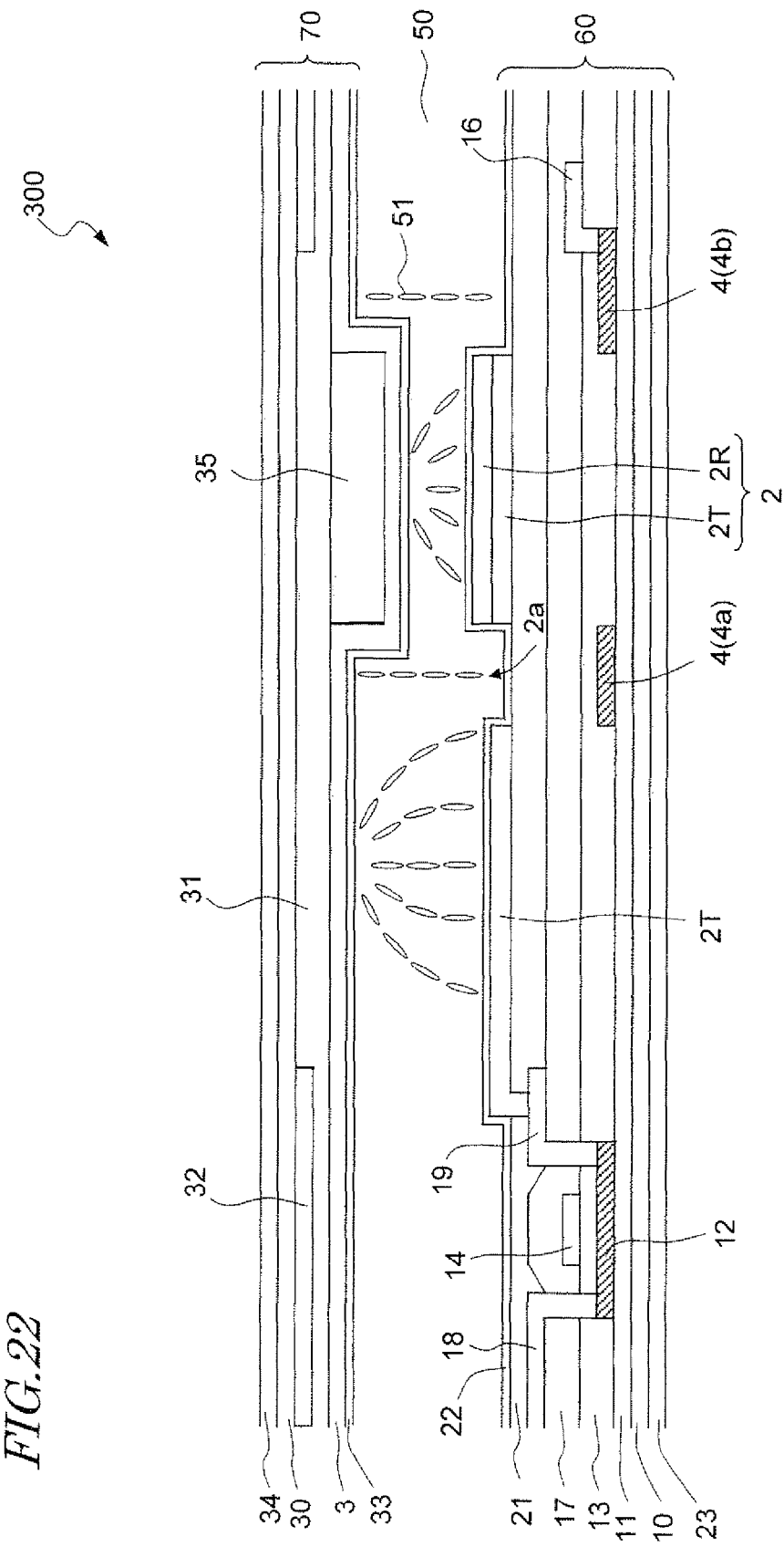
FIG. 22 A cross-sectional view schematically showing the liquid crystal display device 300 according to a preferred embodiment of the present invention, showing a cross section along line 22A-22A' in FIG. 21.

FIG. 21 and FIG. 22 show a liquid crystal display device 300 according to the present embodiment. FIG. 21 is an upper plan view schematically showing a region corresponding to one pixel of the liquid crystal display device 300. FIG. 22 is a cross-sectional view along line 22A-22A' in FIG. 21.

Each pixel of the liquid crystal display device 300 includes a transmission region T which presents display in the transmission mode and a reflection region R which presents display in the reflection mode. A pixel electrode 2 of the liquid crystal display device 300 includes a transparent electrode 2T which is made of an electrically conductive material having a high light transmittance (e.g. ITO) and a reflection electrode 2R which is made of an electrically conductive material having a high light reflectance (e.g. aluminum). The transparent electrode 2T is formed across both of the two subpixels, whereas the reflection electrode 2R is selectively formed in only one of the subpixels, so that the region where the reflection electrode 2R is formed functions as the reflection region R.

Moreover, a transparent dielectric layer 35 is provided in the region of the counter substrate 70 corresponding to the reflection region R, so that the thickness of the liquid crystal layer 50 in the reflection region R is smaller than the thickness of the liquid crystal layer 50 in the transmission region T. The light which is utilized in the reflection mode travels through the liquid crystal layer 50 twice, whereas the light which is utilized in the transmission mode travels through the liquid crystal layer 50 only once. However, as mentioned above, the liquid crystal layer 50 in the reflection region R is made thinner than the liquid crystal layer 50 in the transmission region T, so that the optical path difference between the reflection region R and the transmission region T can be reduced. As a result, display can be suitably presented in both of the reflection region R and the transmission region T.

The liquid crystal display device 300 also includes auxiliary electrodes 4 which are made of the same film as the semiconductor layer 12 of the thin film transistor 1. Therefore, it is possible to stably perform orientation control with an oblique electric field and also suppress decrease in light transmittance without much increase in the number of production steps.

Note that Embodiments 1, 2, and 3 described above illustrate constructions where orientation restriction structures (recessed portions 2a of the pixel electrode 2) are provided only on the active matrix substrate 60. However, as necessary, orientation restriction structures may be provided also on the counter substrate 70.

Figure 23:
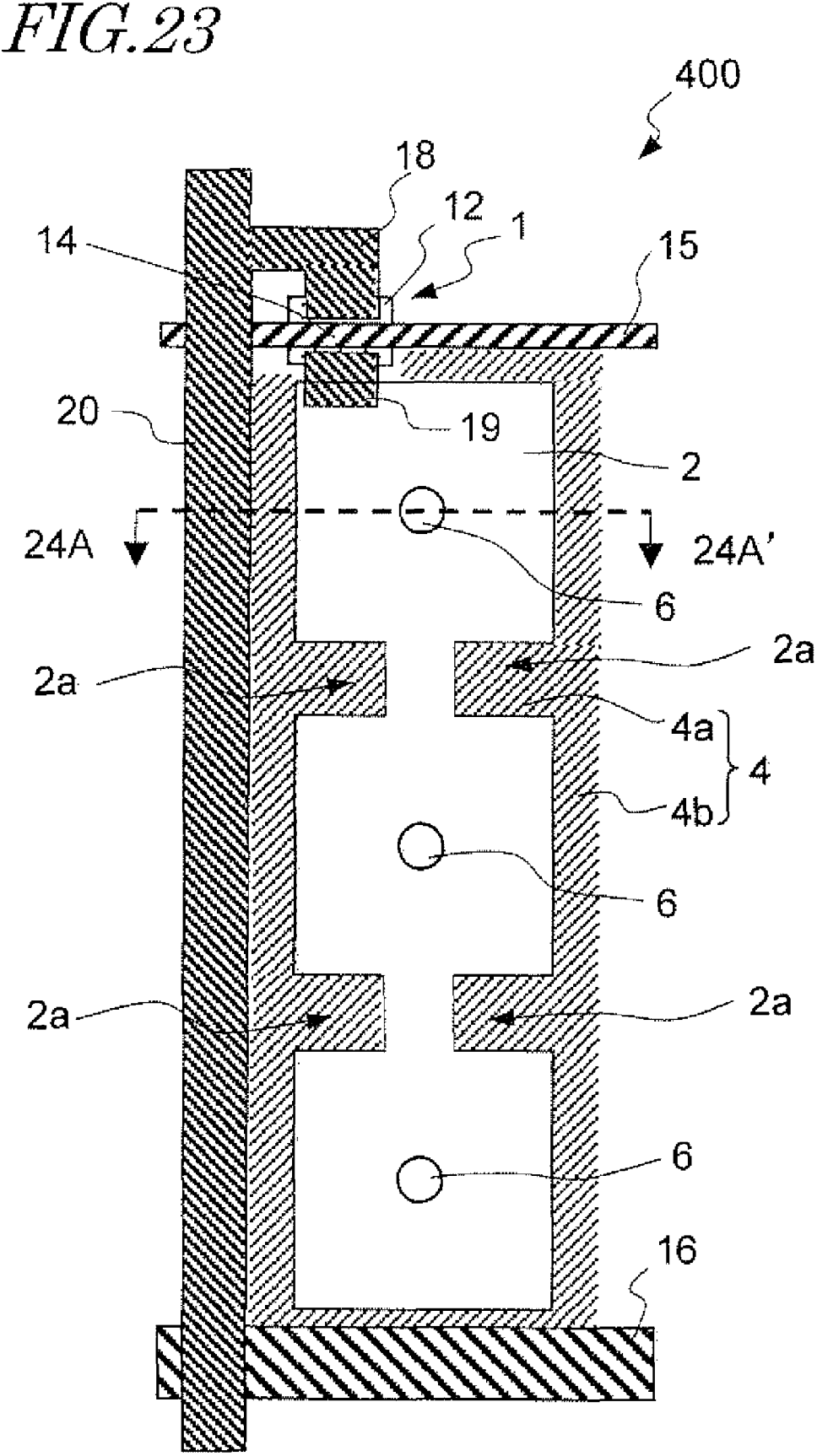
FIG. 23 An upper plan view schematically showing a liquid crystal display device 400 according to a preferred embodiment of the present invention.
Figure 24:
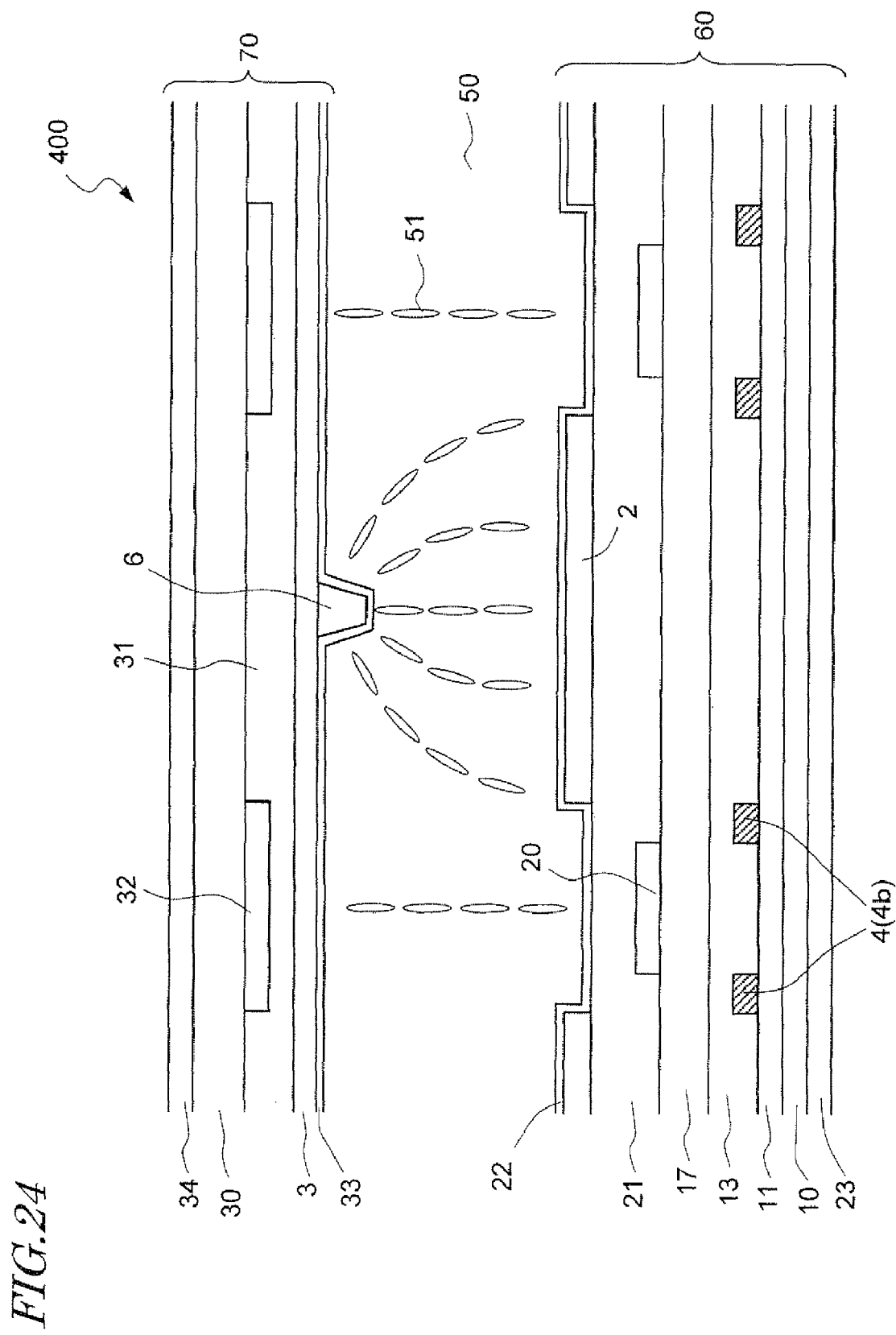
FIG. 24 A cross-sectional view schematically showing the liquid crystal display device 400 according to a preferred embodiment of the present invention, showing a cross section along line 24A-24A' in FIG. 23.

FIG. 23 and FIG. 24 show a liquid crystal display device 400 which has orientation restriction structures also on the counter substrate 70. As shown in FIG. 23 and FIG. 24, the liquid crystal display device 400 differs from the liquid crystal display device 100 of Embodiment 1 in that protrusions 6 are provided on the counter substrate 70.

Each protrusion 6 projecting toward the liquid crystal layer 50 has a slanted side face, and an orientation restriction force is exhibited due to an anchoring effect of the vertical alignment film 33 on this side face. The orientation restriction force due to the protrusion 6 acts to orient the liquid crystal molecules 51 in the same directions as the orientation restriction forces due to the recessed portions 2a of the pixel electrode 2, so that the axisymmetric orientation of the liquid crystal molecules 51 in the subpixel is further stabilized. Moreover, since the axisymmetric orientation is created around the protrusion 6 which is provided in the substantial center of a subpixel (i.e., the protrusion 6 is provided in a region corresponding to the substantial center of a liquid crystal domain), the center of the axisymmetric orientation is fixed near the protrusion 6.

Thus, the axisymmetric orientation can be stabilized by: restricting the orientation directions, mainly, the liquid crystal molecules 51 around the subpixel with the orientation restriction structures provided on the one substrate (the recessed portions 2a or apertures of the pixel electrode 2), and restricting the orientations of the liquid crystal molecules 51 at the central portion of the subpixel with the orientation restriction structure (protrusion 6) provided on the other substrate. This makes it possible to shorten the response time in gray-scale displaying, and the time in which a disturbance in orientation resulting from pressing the panel surface is eliminated.

Note that the orientation restriction structures to be provided on the counter substrate 70 are not limited to the protrusion 6 as illustrated. For example, apertures located at the subpixel centers may be provided on the counter electrode 3.

INDUSTRIAL APPLICABILITY

According to the present invention, in a vertical alignment mode liquid crystal display device, it is possible to stably perform orientation control with an oblique electric field, and also suppress decrease in light transmittance without much increase in the number of production steps. The present invention is suitably used for a transmission type or transmission/reflection combination type liquid crystal display device which is active-matrix driven.

The invention claimed is:

1. A liquid crystal display device comprising a first substrate, a second substrate provided so as to oppose the first substrate, and a vertical-alignment type liquid crystal layer provided between the first substrate and the second substrate, the liquid crystal display device having a plurality of pixels each including: a switching element which is provided on the first substrate and at least includes a semiconductor layer; a pixel electrode electrically connected to the switching element; a counter electrode opposing the pixel electrode; and the liquid crystal layer interposed between the pixel electrode and the counter electrode, the pixel electrode including at least one aperture or recessed portion formed at a predetermined position in the pixel, and in each of the pixels, when at least a predetermined voltage is applied across the liquid crystal layer, a plurality of regions being created where liquid crystal molecules tilt in respectively different azimuthal directions, wherein, the first substrate includes an auxiliary electrode to which a different potential from that for the pixel electrode is applied; and the auxiliary electrode includes a portion overlapping at least one aperture or recessed portion of the pixel electrode, and is made of a same film as the semiconductor layer of the switching element.

2. The liquid crystal display device of claim 1, wherein the auxiliary electrode further includes a portion located near an outer periphery of the pixel electrode.

3. The liquid crystal display device of claim 1, wherein, in each of the plurality of pixels, a plurality of liquid crystal domains each exhibiting an axisymmetric orientation are created when at least a predetermined voltage is applied across the liquid crystal layer.

4. The liquid crystal display device of claim 1, wherein a potential which is substantially the same as that for the counter electrode is applied to the auxiliary electrode.

5. The liquid crystal display device of claim 1, wherein the switching element is a thin film transistor whose channel region is a portion of the semiconductor layer.

6. The liquid crystal display device of claim 1, wherein the semiconductor layer and the auxiliary electrode are made of amorphous silicon or crystalline silicon.

7. The liquid crystal display device of claim 1, wherein the auxiliary electrode has a light transmittance of 60% or more.

8. The liquid crystal display device of claim 1, wherein,
the first substrate includes a storage capacitor line; and
the auxiliary electrode is electrically connected to the storage capacitor line.

9. The liquid crystal display device of claim 8, wherein,
the first substrate includes a connection electrode for electrically connecting the auxiliary electrode and the storage capacitor line; and
the connection electrode is provided outside a displaying region which is defined by the plurality of pixels.

10. The liquid crystal display device of claim 9, wherein,
the first substrate includes a signal line; and
the connection electrode is made of a same film as the signal line.

11. The liquid crystal display device of claim 8, wherein,
the first substrate includes a connection electrode for electrically connecting the auxiliary electrode and the storage capacitor line;
the connection electrode is provided in each of the plurality of pixels; and
the auxiliary electrode partially overlaps the storage capacitor line.

12. The liquid crystal display device of claim 11, wherein the connection electrode is disposed so that the entire connection electrode overlaps the storage capacitor line.

* * * * *